US011221705B2

(12) United States Patent
Agari et al.

(10) Patent No.: US 11,221,705 B2
(45) Date of Patent: Jan. 11, 2022

(54) TOUCH PANEL AND DISPLAY DEVICE INCLUDING A PRESSURE-SENSITIVE SENSOR

(71) Applicant: MITSUBISHI ELECTRIC CORPORATION, Chiyoda-ku (JP)

(72) Inventors: Masafumi Agari, Tokyo (JP); Tae Orita, Tokyo (JP); Takeshi Ono, Tokyo (JP); Toshiaki Fujino, Tokyo (JP); Seiichiro Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/488,759

(22) PCT Filed: Feb. 27, 2018

(86) PCT No.: PCT/JP2018/007067
§ 371 (c)(1),
(2) Date: Aug. 26, 2019

(87) PCT Pub. No.: WO2018/168423
PCT Pub. Date: Sep. 20, 2018

(65) Prior Publication Data
US 2020/0285366 A1 Sep. 10, 2020

(30) Foreign Application Priority Data
Mar. 15, 2017 (JP) .............................. JP2017-049615

(51) Int. Cl.
*G06F 3/045* (2006.01)
*G06F 3/041* (2006.01)
*G06F 3/044* (2006.01)

(52) U.S. Cl.
CPC ........ *G06F 3/04142* (2019.05); *G06F 3/0445* (2019.05); *G06F 3/0448* (2019.05);
(Continued)

(58) Field of Classification Search
CPC .. G06F 3/04142; G06F 3/0445; G06F 3/0448; G06F 2203/04105; G06F 2203/04103; G06F 2203/04107
See application file for complete search history.

(56) References Cited

U.S. PATENT DOCUMENTS

2011/0157087 A1\* 6/2011 Kanehira .............. G06F 3/0446
345/174
2013/0147739 A1\* 6/2013 Berg ..................... G06F 3/0414
345/173
(Continued)

FOREIGN PATENT DOCUMENTS

JP 2010-244514 A 10/2010
JP 2011-100364 A 5/2011
(Continued)

OTHER PUBLICATIONS

International Search Report dated Apr. 17, 2018 in PCT/JP2018/007067 filed on Feb. 27, 2018.

*Primary Examiner* — Adam J Snyder
(74) *Attorney, Agent, or Firm* — Xsensus LLP

(57) ABSTRACT

A touch panel according to the present invention includes a touch sensor substrate having a touch sensor portion in the central portion of the touch sensor substrate and having a first electrode and a second electrode in the inner peripheral (Continued)

portion of the touch sensor substrate, a protective plate to cover the front surface of the touch sensor substrate, a dielectric sheet provided between the touch sensor substrate and the protective plate, and a conductive member disposed at a position so as to face the first electrode and the second electrode, wherein the first electrode, the second electrode, and the conductive member constitute a pressure-sensitive sensor. With this structure, a touch panel having a pressure-sensitive sensor and a display device provided with the touch panel can be manufactured without an increase in the manufacturing time.

18 Claims, 17 Drawing Sheets

(52) U.S. Cl.
CPC ............ *G06F 2203/04103* (2013.01); *G06F 2203/04105* (2013.01); *G06F 2203/04107* (2013.01)

(56) References Cited

U.S. PATENT DOCUMENTS

| | | | |
|---|---|---|---|
| 2016/0034087 A1* | 2/2016 | Kim | G06F 3/0443 |
| | | | 345/173 |
| 2016/0035290 A1 | 2/2016 | Kim et al. | |
| 2016/0088133 A1* | 3/2016 | Kim | G06F 3/044 |
| | | | 345/174 |
| 2016/0195971 A1 | 7/2016 | Ando et al. | |
| 2017/0269756 A1* | 9/2017 | Wang | G06F 3/0445 |
| 2018/0018056 A1* | 1/2018 | Xu | G06F 3/0445 |
| 2018/0052350 A1* | 2/2018 | Zhao | G06F 3/041 |
| 2018/0232096 A1* | 8/2018 | Cheng | G06F 3/044 |

FOREIGN PATENT DOCUMENTS

| | | |
|---|---|---|
| JP | 2011-170659 A | 9/2011 |
| JP | 2011-221856 A | 11/2011 |
| JP | 2014-235477 | 12/2014 |
| JP | 2015-018424 A | 1/2015 |
| JP | 2016-40711 A | 3/2016 |
| WO | WO 2014/057594 A1 | 4/2014 |
| WO | WO 2015/041130 A1 | 3/2015 |

\* cited by examiner

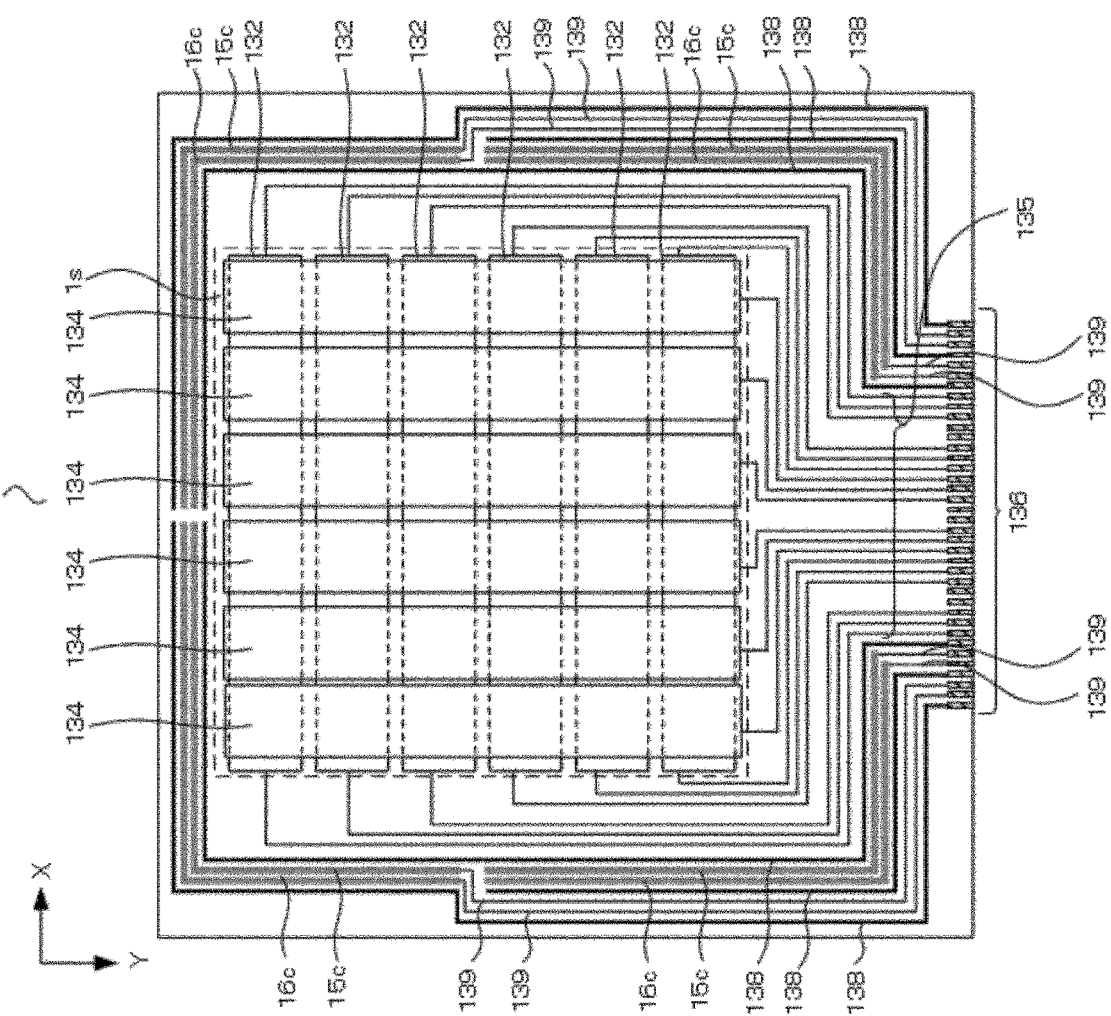

TOUCH PANEL AND DISPLAY DEVICE INCLUDING A PRESSURE-SENSITIVE SENSOR

TECHNICAL FIELD

The present invention relates to a touch panel having a pressure-sensitive sensor, and a display device provided with the touch panel.

BACKGROUND ART

In a conventional touch panel having a pressure-sensitive sensor, the pressure-sensitive sensor is provided between the back surface of the touch panel and a marginal portion of the housing. When an operation element such as a touch pen or a human finger touches an operation input screen of the touch panel, the touch panel detects the position touched by the operation element. Then, simultaneously, the pressure-sensitive sensor detects the pressing force. Owing to the detection of the position touched by the operation element as well as the detection of the pressing force by the pressure-sensitive sensor, an input to the touch panel can be determined. With this determination, it is possible to reduce an erroneous input that is not a determined input and is caused alone by a contact of an operation element on the operation input screen of the touch panel (for example, Patent Document 1).

PRIOR ART DOCUMENTS

Patent Document

Patent Document 1: Japanese Laid-Open Patent Publication No. 2010-244514

SUMMARY OF THE INVENTION

Problems to be Solved by the Invention

A touch panel having a pressure-sensitive sensor disclosed in Patent Document 1 is structured in such a manner that the pressure-sensitive sensor is disposed between the back surface of the touch panel and the marginal portion of the housing. Therefore, the manufacturing process of the touch panel requires a step to mount the pressure-sensitive sensor onto the marginal portion of the housing and a step to mount the touch panel onto the pressure-sensitive sensor. Thus, a problem arises in that these additional steps lead to an increase in the manufacturing time compared with the manufacturing of a touch panel without a pressure-sensitive sensor.

The present invention is made to solve the problem, and the step to mount the pressure-sensitive sensor onto the marginal portion of the housing and the step to mount the touch panel onto the pressure-sensitive sensor can be simplified in the manufacturing processes of a touch panel having a pressure-sensitive sensor or of a display device provided with the touch panel.

Means for Solving Problem

A touch panel according to the present invention includes a touch sensor substrate having a central portion, an inner peripheral portion, and a touch sensor portion in the central portion, a protective plate to cover the front surface of the touch sensor substrate, a first dielectric sheet provided between the touch sensor substrate and the protective plate, a first electrode and a second electrode disposed in the inner peripheral portion of the front surface of the touch sensor substrate, and a conductive member disposed between the touch sensor substrate and the protective plate and at a position so as to face the first electrode and the second electrode, wherein the first dielectric sheet is disposed between the first electrode and the conductive member, and the second electrode and the conductive member and also between the first electrode and the second electrode, and thus the first electrode, the second electrode, and the conductive member constitute a pressure-sensitive sensor.

Effects of the Invention

According to the present invention, a pressure-sensitive sensor is provided on the touch sensor substrate, so that the two steps—the step to mount the pressure-sensitive sensor onto the marginal portion of the housing and the step to mount the touch panel onto the pressure-sensitive sensor can be eliminated. Thus, a touch panel having a pressure-sensitive sensor and a display device provided with the touch panel can be manufactured without an increase in the manufacturing time.

BRIEF DESCRIPTION OF THE DRAWINGS

FIG. 17 is a plan view showing a touch sensor substrate 17c according to a fifth embodiment of the present invention.

EMBODIMENTS FOR CARRYING OUT THE INVENTION

First Embodiment

Figure 1:
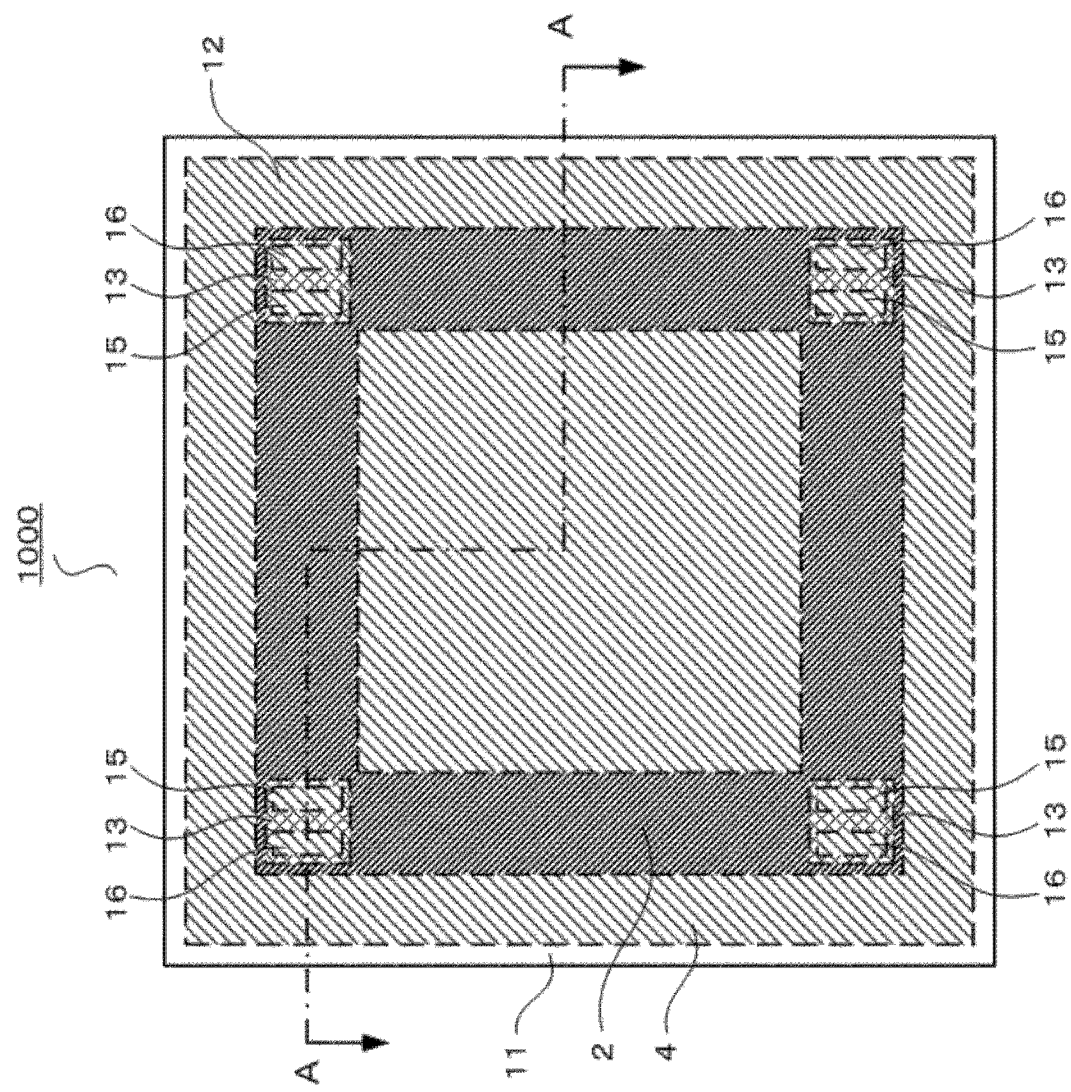
FIG. 1 is a plan view showing a display device 1000 provided with a touch panel according to a first embodiment of the present invention.
Figure 2:
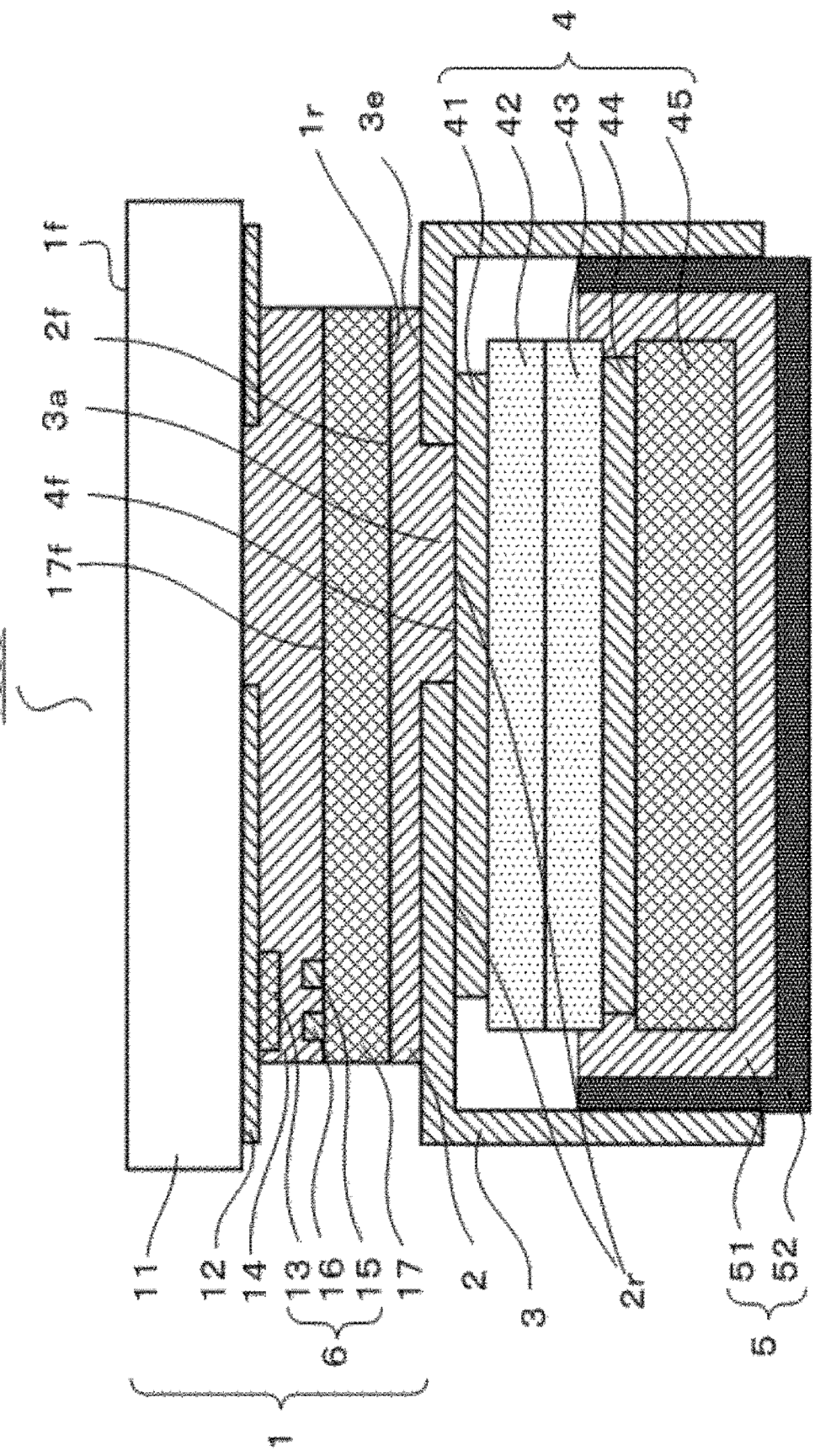
FIG. 2 is a cross-sectional view of the display device 1000.
Figure 3:
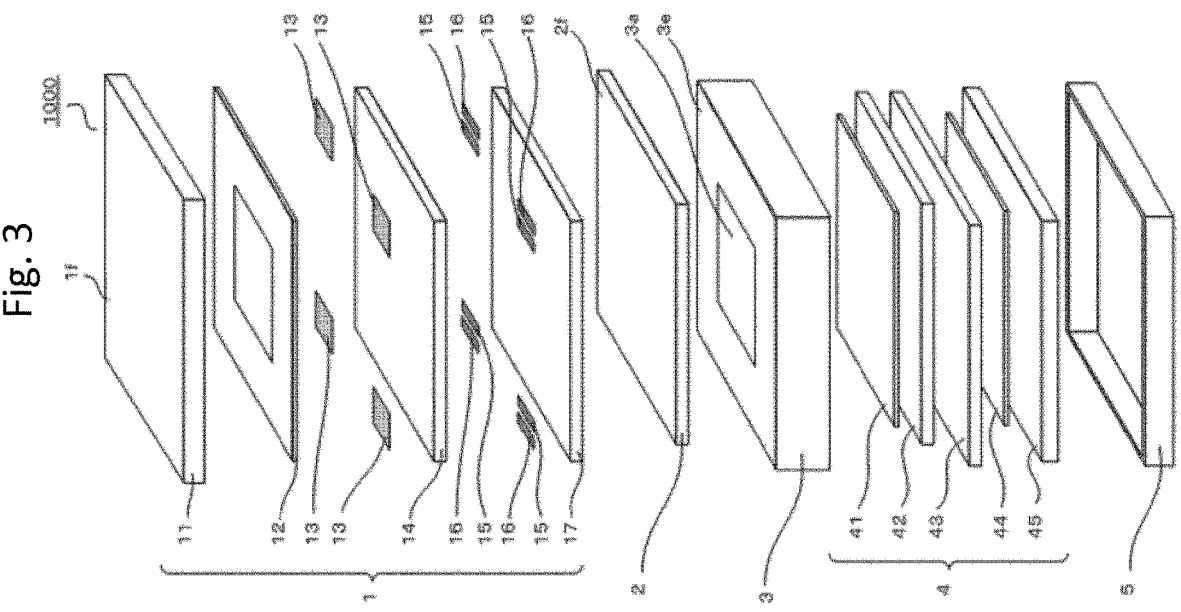
FIG. 3 is an exploded perspective view of a structure of the display device 1000.

FIG. 1 to FIG. 11 show a first embodiment for carrying out the present invention. First, referring to FIG. 1 to FIG. 3, a structure of a display device 1000 provided with a touch panel according to the first embodiment will be described. FIG. 1 is a plan view of the display device 1000 according to the first embodiment for carrying out the present invention, and FIG. 2 is a cross-sectional view thereof taken along the dash-dotted line A-A shown in FIG. 1. Further, FIG. 3 is an exploded perspective view of the display device 1000.

The display device 1000 according to the present invention includes a touch panel 1, a dielectric sheet 2, a frame 3, and a liquid crystal panel 4. Note that the dielectric sheet 2 is an example of the second dielectric sheet described in the claims and the liquid crystal panel 4 is an example of the display panel described in the claims. A back surface 1r of the touch panel 1 is adhered to a front surface 2f of the dielectric sheet 2. In addition, a back surface 2r of the dielectric sheet 2 is adhered to a marginal portion 3e of the frame 3. Further, the back surface 2r of the dielectric sheet 2 is adhered to a display surface 4f of the liquid crystal panel 4 in an opening 3a of the frame 3.

In addition, the frame 3 and a rear cover 5 are fitted and fixed together, and the liquid crystal panel 4 is housed inside the space surrounded by the frame 3 and the rear cover 5.

As the dielectric sheet 2, an optical clear adhesive (OCA) being an adhesive film, an optical clear resin (OCR) being a liquid adhesive, or the like are used. Note that, regarding the types of an OCA and an OCR, an ultraviolet ray curable type, a heat curing type, and the like are available.

Next, an example of a manufacturing method in which an OCA being a film-type adhesive is used for the dielectric sheet 2 will be described. First, the front surface of the OCA and the back surface 1r of the touch panel 1 are adhered together. Then, the back surface of the OCA and the marginal portion 3e of the frame 3 are adhered together and the back surface of the OCA and the display surface 4f of the liquid crystal panel 4 are adhered together. Then, when the OCA is an ultraviolet ray curable type, the OCA is cured by radiating ultraviolet rays, and when the OCA is a heat curing type, the OCA is cured by heating. Thus, the touch panel 1 and the liquid crystal panel 4 are adhered to each other and the touch panel 1 and the frame 3 are adhered to each other.

Further, an example of a manufacturing method in which an OCR being a liquid-type adhesive is used for the dielectric sheet 2 will be described. First, the OCR is applied to the back surface 1r of the touch panel 1. The back surface 2r of the dielectric sheet 2 and the marginal portion 3e of the frame 3 are adhered together, and the back surface 1r of the touch panel 1 and the display surface 4f of the liquid crystal panel 4 are adhered together. Then, when the OCR is an ultraviolet ray curable type, the OCR is cured by radiating ultraviolet rays, and when the OCR is a heat curing type, the OCR is cured by heating. Thus, the touch panel 1 and the liquid crystal panel 4 are adhered to each other and the touch panel 1 and the frame 3 are adhered to each other.

Since the OCA and the OCR are cured to such an extent that a certain level of elasticity remains, the dielectric sheet 2 can hold the touch panel 1. The thickness of the dielectric sheet 2 is set to such an extent that the level difference at the opening 3a of the frame 3 can be filled with the sheet (for example, up to about 1 mm).

Further, the refractive index of the OCA and the OCR after the cure (namely, the refractive index of the dielectric sheet 2) are set to be substantially equal to those of the materials for the back surface 1r of the touch panel 1 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

Next, the touch panel 1 will be described in detail. When an operation element such as a touch pen or a human finger touches the front surface 1f of the touch panel 1, the touch panel 1, as the functions thereof, detects the position on the front surface 1f and the pressing force of the operation element and outputs the detection information to the outside.

The touch panel 1 includes a protective plate 11 made of a transparent plate such as a glass or an acrylic resin, a light-shielding seal 12 formed by printing or the like provided in the inner peripheral portion on the back surface of the protective plate 11, and a touch sensor substrate 17 made of a transparent plate such as a glass or an acrylic resin. In other words, the light-shielding seal 12 is provided on a portion of the back surface of the protective plate 11 (the inner peripheral portion thereof) that faces a portion ranging from the outer periphery of the touch sensor portion 1s to be described later, to the outermost periphery of the touch sensor substrate 17. In addition, the protective plate 11 and the touch sensor substrate 17 are adhered to each other via the dielectric sheet 14. Note that the dielectric sheet 14 is an example of the first dielectric sheet described in the claims. For the dielectric sheet 14, similarly to the dielectric sheet 2, an OCA being a film-type adhesive or an OCR being a liquid-type adhesive is used. Since the dielectric sheet 14 is cured to such an extent that a certain level of elasticity remains, the dielectric sheet 14 can expand and contract in accordance with the pressing force and can hold the protective plate 11.

A first electrode 15 and a second electrode 16 are formed on a front surface 17f of the touch sensor substrate 17. A conductive member 13 is disposed at a position so as to the first electrode 15 and the second electrode 16 via the dielectric sheet 14. Note that the conductive member 13 is an example of the conductive member described in the claims. The first electrode 15, the second electrode 16, and the conductive member 13 collectively form a pressure-sensitive sensor 6. The first electrode 15 and the second electrode 16 are connected to a pressure-sensitive sensor detection circuit 85, to be described later, via wires (not illustrated). In the present first embodiment, the conductive member 13 is disposed on the back surface of the protective plate 11 via the light-shielding seal 12.

In addition, the elastic modulus of the dielectric sheet 14 is generally about between $10^3$ and $10^6$ Pa. When the amount of deformation caused by the pressing force is larger, the change in the capacitance of the pressure-sensitive sensor 6 depending on the pressing force is larger. Thus, the detection sensitivity can be increased. In contrast, when the amount of deformation caused by the pressing force is larger, the response time of the pressure-sensitive sensor 6 becomes longer. Therefore, in accordance with the curing conditions of the above-mentioned OCA and OCR with respect to the ultraviolet ray and the heat, the elasticity and plasticity of the dielectric sheet 14 are to be appropriately controlled.

Next, the liquid crystal panel 4 will be described in detail. The liquid crystal panel 4, provided with a screen on its display surface 4f, has a function to display a movie and a still image on the screen when it receives image signals from the outside. Note that the screen is disposed to fit in the opening 3a of the frame 3, so that the image screen can be seen from the direction of the front surface 1f of the touch panel 1. The liquid crystal panel 4 includes a color filter substrate 42 with a color filter, a thin film transistor (TFT) array substrate 43 with TFT, the polarizing plate 41 on the front surface of the color filter substrate 42, a polarizer 44 on the back surface of the TFT array substrate 43, and a backlight module 45. The color filter substrate 42 and the TFT array substrate 43 are adhered together, having a liquid crystal (not illustrated) sandwiched between them.

Next, the rear cover 5 will be described in detail. The rear cover 5 includes a soft cover 51 and a hard cover 52. The soft cover 51 made of an elastic material such as resin is in contact with the side surfaces and the back surface of the liquid crystal panel 4 and absorbs shocks being externally transmitted to the liquid crystal panel 4. The hard cover 52 made of a hard material such as a metal contains the soft cover 51 and protects the liquid crystal panel 4 from shocks and against water leakage.

Figure 4:
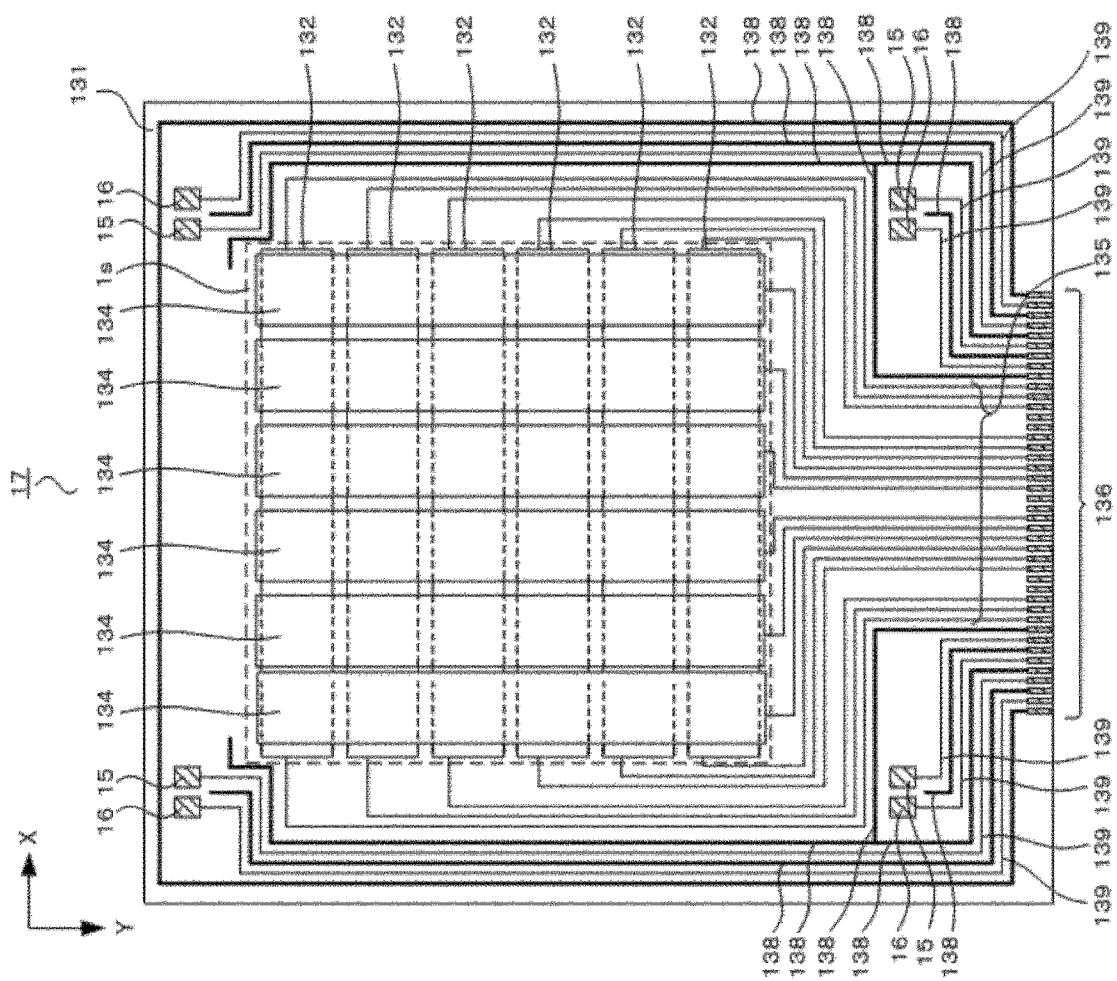
FIG. 4 is a plan view of a touch sensor substrate 17.
Figure 5:
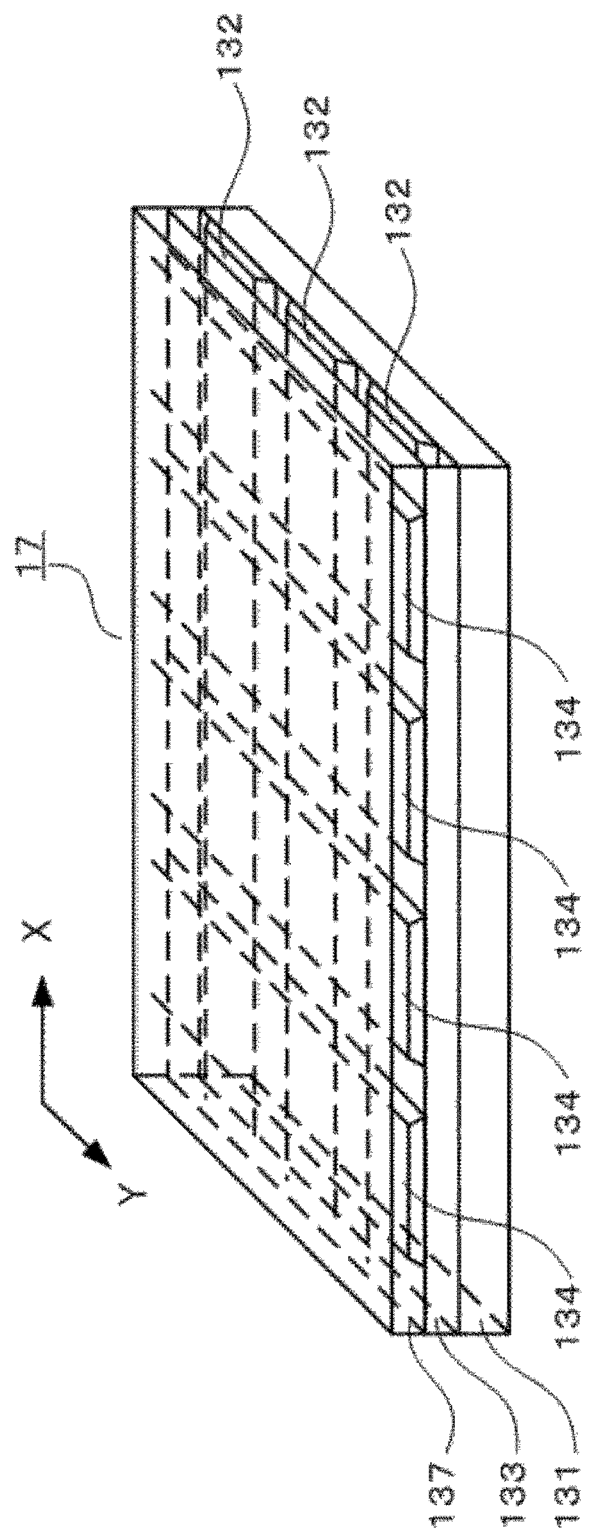
FIG. 5 is a perspective view of a part of the touch sensor substrate 17.

Next, referring to FIG. 4 and FIG. 5, a structure of the touch sensor substrate 17 will be described. FIG. 4 is a plan view of the front side of the touch sensor substrate 17. FIG. 5 is a perspective view of a part of the touch sensor substrate 17.

As shown in FIG. 4 and FIG. 5, the touch sensor substrate 17 includes, on a transparent substrate 131 such as a glass and an acrylic resin, a plurality of row sensor electrodes 132 arranged in the Y-direction shown in the figure, and an interlayer insulating film 133 formed so as to cover the row sensor electrodes 132. The touch sensor substrate 17 further includes a plurality of column sensor electrodes 134 arranged in the X-direction shown in the figure on the interlayer insulating film 133 and a protective film 137 formed to cover the column sensor electrodes 134. Further, each of the row sensor electrodes 132 and each of the column sensor electrodes 134 are connected to a first end of each of lead wires 135. In addition, a second end of each of the lead wires 135 is connected to each of connecting terminals 136.

The touch sensor portion 1s in which the row sensor electrodes 132 and the column sensor electrodes 134 are formed is a portion where a position of an operation element touching on the front surface 1f of the touch panel 1 is to be detected. The first electrode 15 and the second electrode 16 are disposed around the touch sensor portion 1s. In other words, the first electrode 15 and the second electrode 16 are disposed in a portion ranging from the outer periphery of the touch sensor portion 1s occupying the central portion of the touch sensor substrate 17, to the outermost periphery of the touch sensor substrate 17 (the inner peripheral portion thereof). The first electrode 15 and the second electrode 16 are connected to each of the connecting terminals 136 through connecting wires 139 that are each connected to each of those electrodes. The connecting wires 139 exemplify the wire connected to the first electrode and the wire connected to the second electrode that are described in the claims.

Shielding wires 138 are provided between the connecting wires 139, between the connecting wires 139 and the touch sensor portion 1s, and along the outer periphery of the outermost connecting wire 139. An end of each of the shielding wires 138 is connected to one of the connecting terminals 136. In other words, the shielding wires 138 are each disposed along with each of the connecting wires 139.

The shielding wires 138 are grounded through the connecting terminals 136. With this configuration, the breakage of the touch sensor substrate 17 cause by static electricity (for example, introduced through an operator's finger) introduced into the front surface 1f of the touch panel 1 and the noise overlapping with signals in the connecting wires 139 can be prevented.

The row sensor electrodes 132 and the column sensor electrodes 134 are each formed of a transparent conductive film such as indium tin oxide (ITO), a fine metal mesh wire, and the like. The interlayer insulating film 133 and the protective film 137 are each made of a transparent insulating film such as a silicon oxide film, a tetraethyl orthosilicate (TEOS) film, and a silicon nitride film. Generally, the connecting terminals 136 are connected to a flexible printed circuit (FPC), etc. to be electrically connected to the outside.

Note that, as a formation method for the row sensor electrodes 132 and the column sensor electrodes 134, for example, there is a method in which photolithography and etching are used to form the row and column electrodes after the transparent conductive film, the fine metal mesh wires, etc. are deposited on the transparent substrate 131.

In addition, the first electrode 15, the second electrode 16, the shielding wires 138, and the connecting wires 139 are each formed of a transparent conductive film such as ITO or a conductive member such as metal.

Note that, as a formation method for the first electrode 15, the second electrode 16, the shielding wires 138, and the connecting wires 139, for example, there is a method in which photolithography and etching are used to form them after the transparent conductive film, metal, etc. are deposited on the transparent substrate 131.

Further, it is possible to form the first electrode 15, the second electrode 16, the shielding wires 138, and the connecting wires 139 simultaneously or sequentially with the row sensor electrodes 132 or the column sensor electrodes 134. This leads to reduction of manufacturing time of the touch panel.

Figure 6:
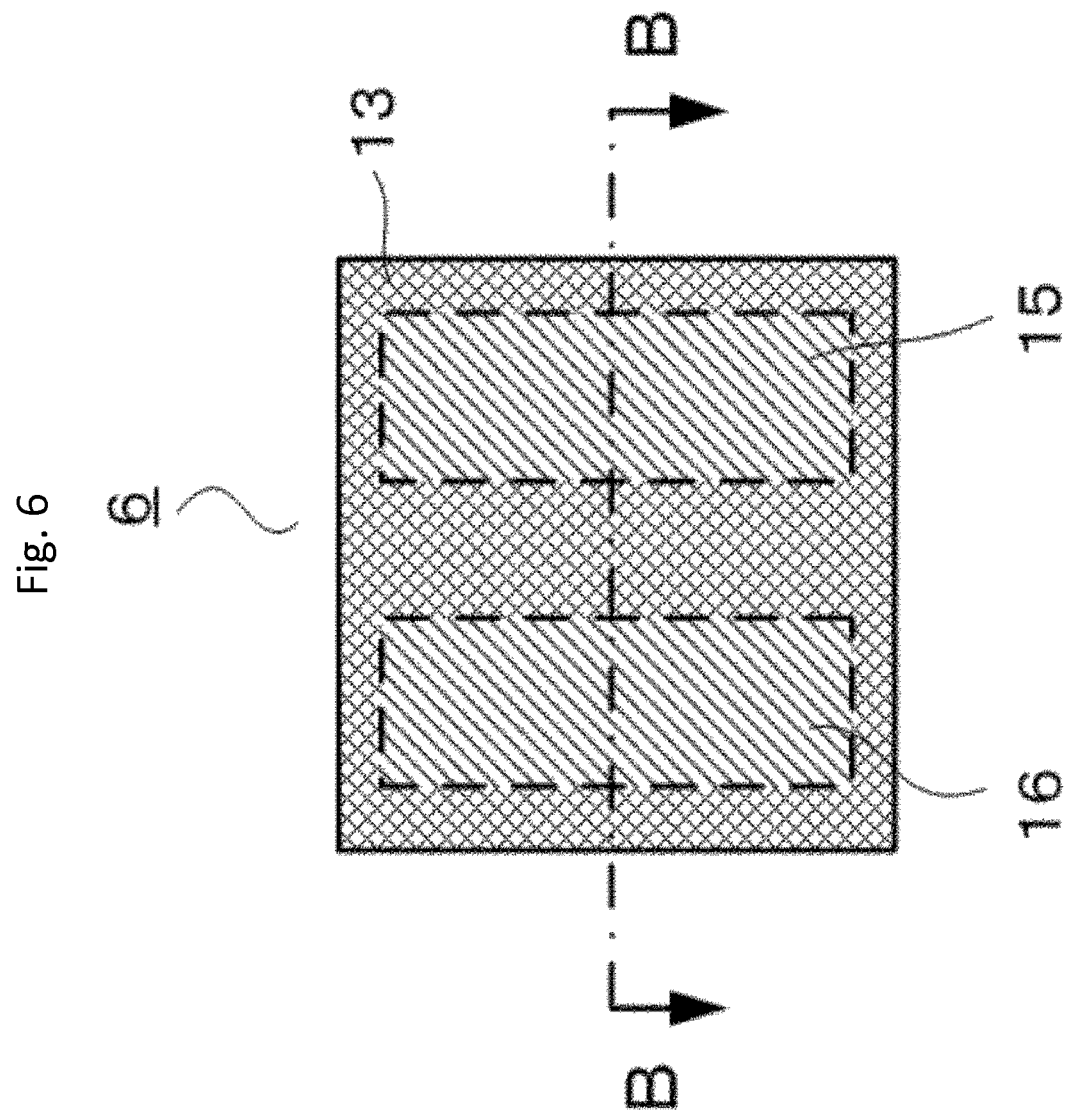
FIG. 6 is a plan view showing a pressure-sensitive sensor 6.
Figure 7:
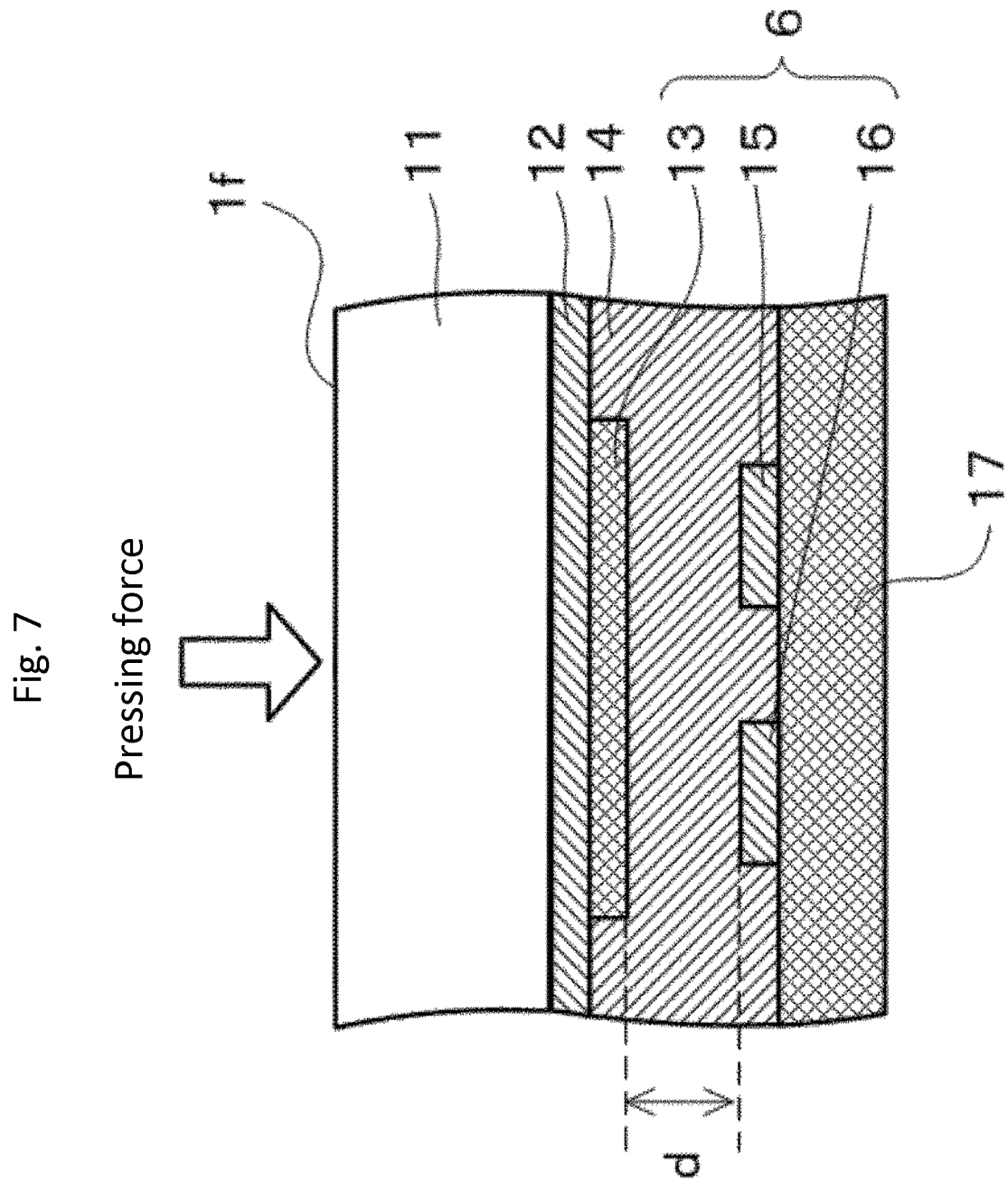
FIG. 7 is a cross-sectional view of the pressure-sensitive sensor 6 and its surroundings.
Figure 8:
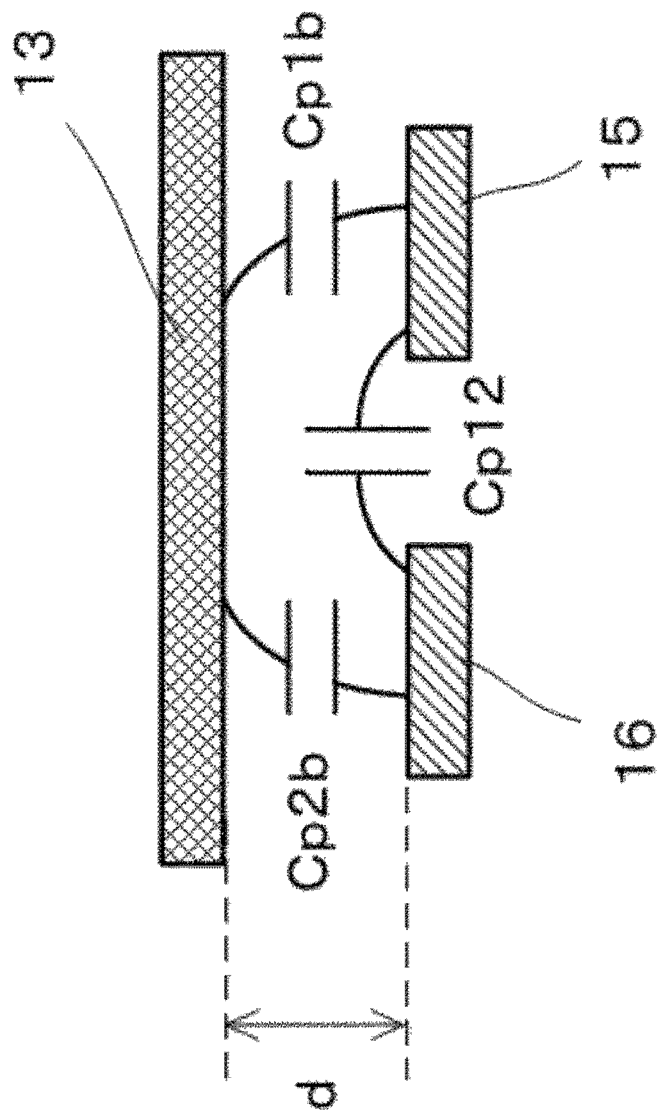
FIG. 8 is a drawing for explaining a configuration of an electrostatic capacitance Cpa in the pressure-sensitive sensor 6.
Figure 9:
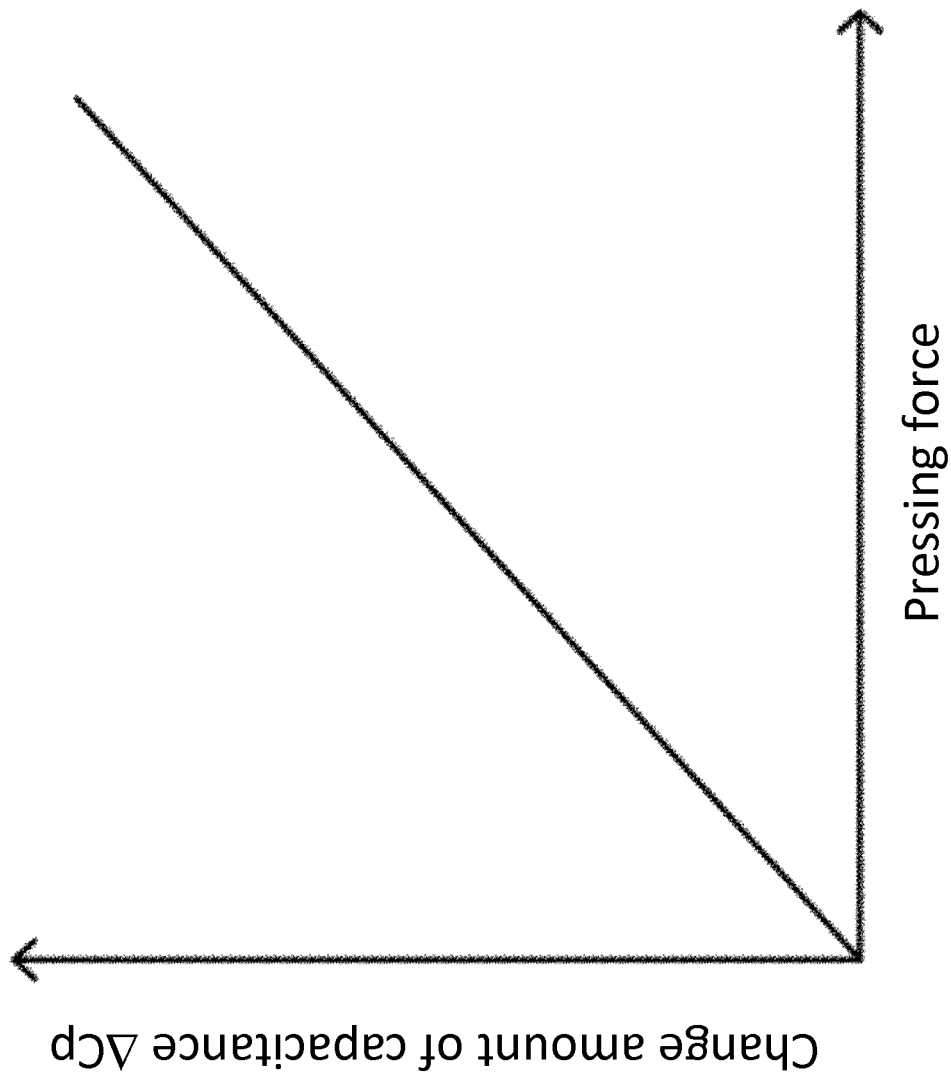
FIG. 9 is a graph showing a relationship between the amount of change in the capacitance Cpa of the pressure-sensitive sensor 6 and pressing force.
Figure 10:
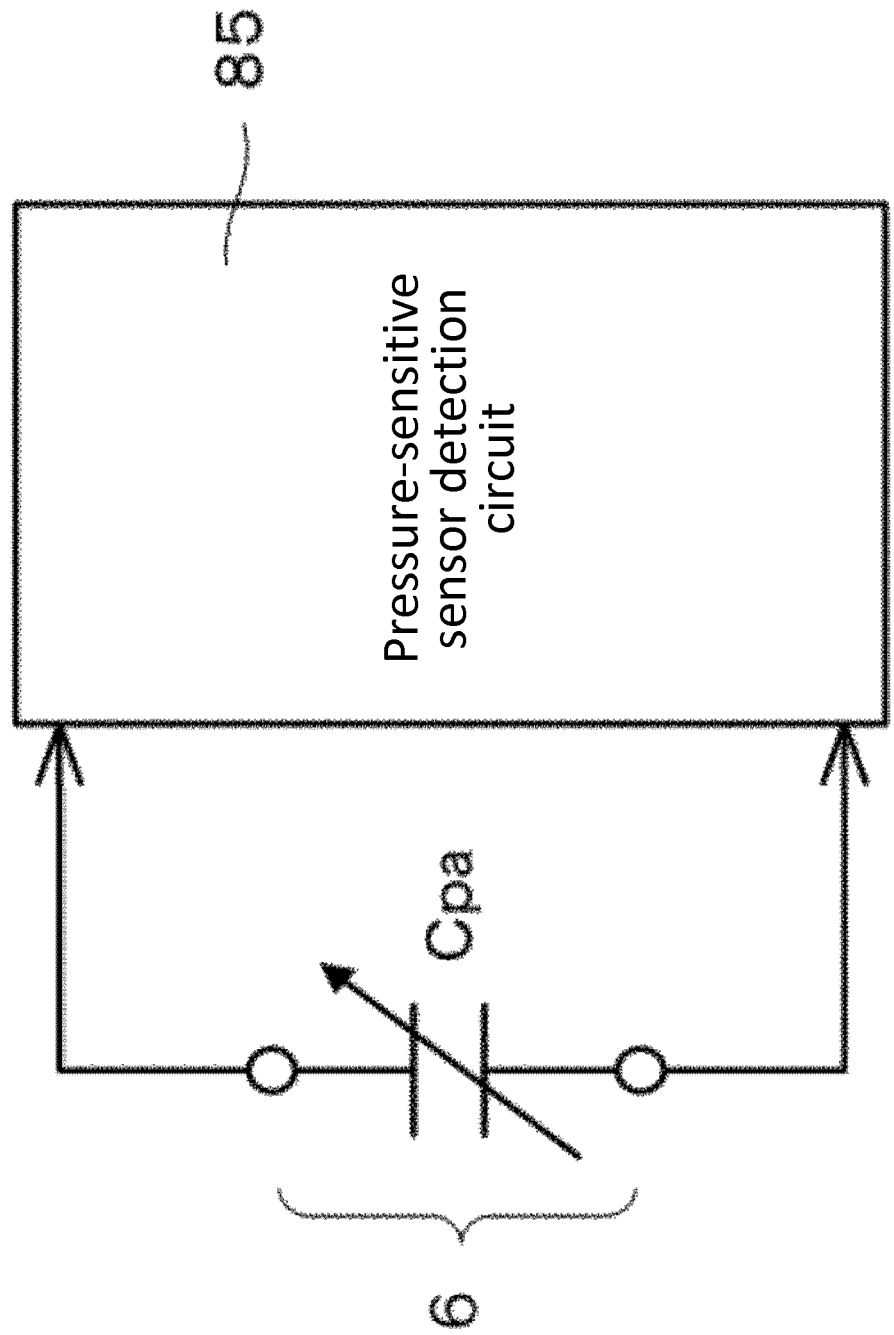
FIG. 10 is an electrical connection diagram of the pressure-sensitive sensor 6.

Next, referring to FIG. 6 to FIG. 10, a structure and an operation of the pressure-sensitive sensor 6 will be described. FIG. 6 is a plan view of the pressure-sensitive sensor 6 and its surroundings. FIG. 7 is a cross-sectional view of the sensor taken along the dash-dotted line B-B shown in FIG. 6. FIG. 8 is a drawing for explaining capacitance components constituting the capacitance Cpa in the pressure-sensitive sensor 6. FIG. 9 is a graph showing a relation between the amount of change in the capacitance Cpa of the pressure-sensitive sensor 6 and the pressing force. FIG. 10 is an electrical connection diagram of the pressure-sensitive sensor 6.

Referring to FIG. 6 and FIG. 7, a plan structure and a cross sectional structure of the pressure-sensitive sensor 6 will be described. The first electrode 15 and the second electrode 16 are formed on the touch sensor substrate 17. The conductive member 13 is disposed on the inner peripheral portion of the back surface of the protective plate 11 so as to face the first electrode 15 and the second electrode 16 via the dielectric sheet 14. The distance d indicates the distance from the first electrode 15 and the second electrode 16 to the conductive member 13. As previously described, when a pressing force is applied by an operation element to the front surface 1f of the touch panel 1, the dielectric sheet 14 expands and contracts, so that the distance d changes within a certain range in accordance with the pressing force.

Note that, the conductive member 13 is formed by using a method such as adhering of a thin conductive plate of metal, etc. or forming of a thin plate by vaporizing a metal material using a deposition technique or the like. It is also possible to use the light-shielding seal 12 as the conductive member 13 by giving conductivity to the light-shielding seal 12 through inclusion of carbon black.

Referring to FIG. 8, the capacitance Cpa that is a main capacitance in the pressure-sensitive sensor 6 will be described. The main capacitance Cpa of the pressure-sensitive sensor 6 is a capacitance formed between the first electrode 15 and the second electrode 16. The capacitance Cpa is mainly the sum of two capacitances. One is the capacitance directly formed between the first electrode 15 and the second electrode 16. The other is the capacitance formed via the conductive member 13. Here, the capacitance Cp12 is defined as the capacitance directly formed, not via the conductive member 13, between the first electrode 15 and the second electrode 16, the capacitance Cp1$b$ is defined as the capacitance formed between the first electrode 15 and the conductive member 13, and the capacitance Cp2$b$ is defined as the capacitance formed between the second electrode 16 and the conductive member 13.

In this case, the capacitance between the first electrode 15 and the second electrode 16 formed via the conductive member 13 can be calculated as a serial connection of the capacitance Cp1$b$ and the capacitance Cp2$b$, so that the resultant capacitance value is (Cp1$b$>, Cp2$b$/(Cp1$b$+Cp2$b$)). Therefore, as previously described, the capacitance Cpa is calculated as follows. Cpa=Cp12+(Cp1$b$>, Cp2$b$/(Cp1$b$+Cp2$b$)).

The capacitance Cp12 has a characteristic such that the capacitance decreases with a decrease of the distance d and increases with an increase of the distance d. Since the conductive member 13 is disposed at the position so as to face the first electrode 15 and the second electrode 16, this characteristic stems from the capacitance change due to the change in the distance from the first electrode 15 and the second electrode 16 to the conductive member.

In contrast, regarding the capacitances Cp1$b$ and Cp2$b$, their characteristics are such that their capacitances increase with a decrease of the distance d and decrease with an increase of the distance d. Their characteristics stem from their capacitance changes due to the changes in the distance between the first electrode 15 and the conductive member 13 and the distance between the second electrode 16 and the conductive member 13. As previously described, the first electrode 15 and the second electrode 16 are formed on the touch sensor substrate 17. The conductive member 13 is disposed at the position so as to face the first electrode 15 and the second electrode 16 via the dielectric sheet 14. Thus, the capacitance Cp1$b$ and the capacitance Cp2$b$ simultaneously increase with a decrease of the distance d, and the capacitance Cp1$b$ and the capacitance Cp2$b$ simultaneously decrease with an increase of the distance d. That is, the capacitance (Cp1$b$×Cp2$b$/(Cp1$b$+Cp2$b$)) for the serial connection of the capacitance Cp1$b$ and the capacitance Cp2$b$ has a characteristic such that the capacitance increases with a decrease of the distance d and decreases with an increase of the distance d.

Referring to FIG. 9, the characteristic of the pressure-sensitive sensor 6 will be described. The vertical axis represents the change amount ΔCpa of the capacitance Cpa of the pressure-sensitive sensor 6, and the horizontal axis represents the pressing force. The larger the pressing force is, the more the distance d decreases (becomes short). That is, the sensor has a characteristic such that the change amount \Cpa increases or decreases monotonically in accordance with the pressing force. Such a characteristic can be obtained by properly setting the capacitance Cp12, the capacitance Cp1$b$, and the capacitance Cp2$b$. For example, in a case where the capacitance Cp12 is set to a larger value compared with the capacitance Cp1$b$ and the capacitance Cp2$b$, the change amount ΔCpa decreases with an increase of the pressing force. In contrast, in a case where the capacitance Cp12 is set to a smaller value compared with the capacitance Cp1$b$ and the capacitance Cp2$b$, the change amount ΔCpa increases with an increase of the pressing force.

The capacitance Cp12 increases when the distance between the first electrode 15 and the second electrode 16 is set smaller or when the length of the adjacent sides of the first electrode 15 and the second electrode 16 is set larger. In contrast, the capacitance Cp12 decreases when the distance between the first electrode 15 and the second electrode 16 is set larger or when the length of the adjacent sides of the first electrode 15 and the second electrode 16 is set smaller.

Furthermore, the capacitance Cp1$b$ and the capacitance Cp2$b$ increase when the area of the electrodes facing the conductive member 13 is set larger. In contrast, the capacitance Cp1$b$ and the capacitance Cp2$b$ decrease when the area of the electrodes facing the conductive member 13 is set smaller. That is, the change amount ΔCpa of the capacitance Cpa can be set in accordance with the arrangement, the areas, and the shapes of the first electrode 15, the second electrode 16, and the conductive member 13.

Referring to FIG. 10, an equivalent circuit and electrical connection of the pressure-sensitive sensor 6 will be described. The first electrode 15 being a first end of the pressure-sensitive sensor 6 is connected to a first end of the pressure-sensitive sensor detection circuit 85 via wiring. The second electrode 16 being a second end of the pressure-sensitive sensor 6 is connected to a second end of the pressure-sensitive sensor detection circuit 85 via wiring. Note that, the pressure-sensitive sensor detection circuit 85 will be described later.

As described above, since the change amount ΔCpa of the capacitance Cpa changes in accordance with the pressing force, when an operation element applies the pressing force to the front surface 1$f$ of the touch panel 1, the pressure-sensitive sensor detection circuit 85 can detect the pressing force applied by the operation element to the front surface 1$f$ of the touch panel 1 by detecting the change amount ΔCpa.

Figure 11:
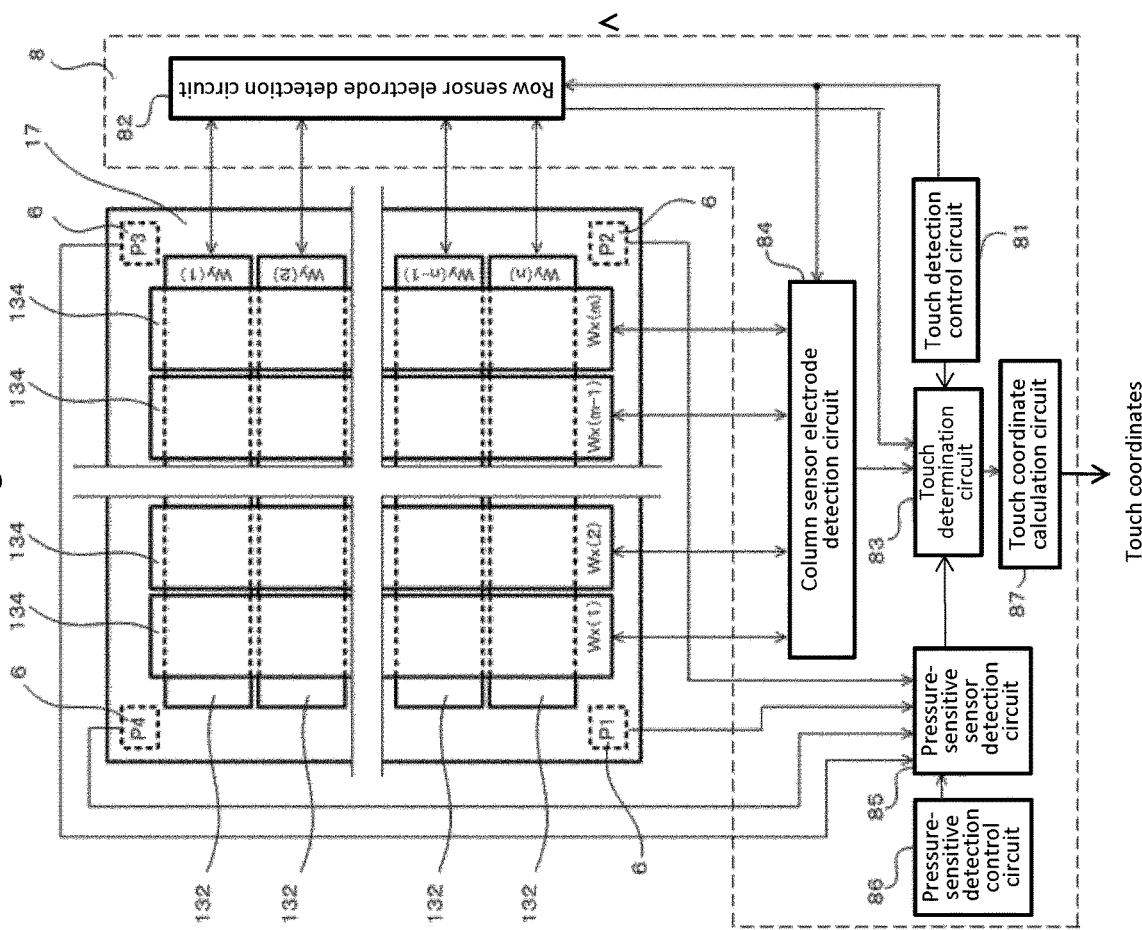
FIG. 11 shows a block diagram of a coordinate detection circuit 8 and a diagram showing an electrical connection between the coordinate detection circuit 8 and the touch sensor substrate 17.

Next, the operation in which the pressing force applied by the operation element is detected and the position on the front surface 1$f$ of the touch panel 1 at which the operation element touches the surface is outputted will be described in detail. FIG. 11 shows a block diagram of the coordinate detection circuit 8 that detects a position on the front surface 1$f$ of the touch panel 1 at which the operation element touches the surface, relevant parts on the touch sensor substrate 17, and the electrical connection between the circuit and the parts.

First, a method to detect the position at which the operation element touches the front surface 1$f$ of the touch panel 1 will be described. Note that, the method for the touch panel 1 to be described in the present first embodiment is called mutual capacitance method, which is one of capacitance methods. As described later, the mutual capacitance method is a method in which voltage is applied sequentially to each of the row sensor electrodes 132, the electric charge amount in each of the column sensor electrodes 134 is read out, and the position touched by the operation element is detected.

Referring to FIG. 11, the coordinate detection circuit 8 includes a touch detection control circuit 81, a row sensor electrode detection circuit 82, a touch determination circuit 83, a column sensor electrode detection circuit 84, a pressure-sensitive sensor detection circuit 85, a pressure-sensitive detection control circuit 86, and a touch coordinate calculation circuit 87.

The row sensor electrode detection circuit 82 is connected individually with each of the plurality of row sensor electrodes 132. Here, for the description of the operation, it is assumed that the number of the row sensor electrodes 132 from the top to the bottom in the drawing is n (n is a natural number), the top of the row sensor electrodes 132 in the drawing is assigned with Wy(1), and the electrodes from the top to the bottom in the drawing are assigned with Wy(1), Wy(2), . . . Wy(n−1), Wy(n) in order.

Similarly, the column sensor electrode detection circuit 84 is connected individually with each of the plurality of column sensor electrodes 134. Note that, for the description of the operation, it is assumed that the number of the column sensor electrodes 134 from the left to the right in the drawing is m (m is a natural number), the left-most of the column sensor electrodes 134 in the drawing is assigned with Wx(1), and the electrodes from the left to the right in the drawing are assigned with Wx(1), Wx(2), . . . Wx(m−1), Wx(m) in order.

Upon instruction from the touch detection control circuit 81, the row sensor electrode detection circuit 82 applies excitation pulses with a predetermined peak voltage value to the row sensor electrodes: Wy(1), Wy(2), . . . Wy(n−1), Wy(n), in order at a predetermined time interval T1. Further, upon instruction from the touch detection control circuit 81, the column sensor electrode detection circuit 84 detects the electric charge amounts at intersections between the row sensor electrodes 132 and the column sensor electrodes 134 within the time interval T1 via the column sensor electrodes 134: Wx(1), Wx(2), . . . Wx(m−1), Wx(m), performs A/D conversion on the analog signals corresponding to the electric charge amounts, and then outputs the digital signals to the touch determination circuit 83. In addition, the touch detection control circuit 81 outputs a signal synchronized with the time interval T1 to the touch determination circuit 83. Through these operations, the touch determination circuit 83 acquires the position information (referred to as coordinates of intersection) of all the intersections between the row sensor electrodes 132 and the column sensor electrodes 134 as well as the information on the electric charge amounts corresponding to the coordinates of the intersections.

Further, the signals corresponding to all of the coordinates of the intersections and the electric charge amounts are outputted from the touch determination circuit 83 to the touch coordinate calculation circuit 87 to be stored therein.

When an operation element touches the front surface 1f of the touch panel 1, the capacitance at the intersection between the row sensor electrode 132 and the column sensor electrode 134 corresponding to the touched position changes, and accordingly, the electric charge amount at the intersection changes. Therefore, it can be seen that the coordinates on the operation screen (referred to as touch coordinates) at which the operation element touches the front surface 1f of the touch panel 1 is in the vicinity of the coordinates of intersections in which the electric charge amounts locally differ among the electric charge amounts in the coordinates of all the intersections.

The pressure-sensitive sensors 6, the positions of which are indicated by P1 to P4, are each connected to the pressure-sensitive sensor detection circuit 85. Upon instruction of the pressure-sensitive detection control circuit 86, the pressure-sensitive sensor detection circuit 85, at a predetermined timing, detects the capacitance Cpa of each of the pressure-sensitive sensors 6 located at the positions P1 to P4, performs A/D conversion on the analog signal corresponding to the capacitance Cpa of each of the pressure-sensitive sensors 6 at the positions P1 to P4, and outputs the resultant signals to the touch determination circuit 83.

Further, an operation in which whether the operation element touches the front surface 1f of the touch panel 1 is determined and the touch coordinates are outputted will be described. When the sum of the change amounts ΔCpa of the capacitances Cpa of the pressure-sensitive sensors 6 located at the positions P1 to P4 equals to or exceeds a predetermined value, the touch determination circuit 83 determines that the touch panel is pressed. Then, the touch determination circuit 83 instructs the touch coordinate calculation circuit 87 to output the touch coordinates to the outside.

Upon instruction from the touch determination circuit 83 to output the touch coordinates to the outside, the touch coordinate calculation circuit 87 calculates the touch coordinates from all of the coordinates of the intersections and the electric charge amounts that are stored and outputs the signals corresponding to the touch coordinates. Note that, the period (hereinafter, referred to as touch detection frame) in which the mutual capacitance values at all the intersections between the column sensor electrodes 134 and the row sensor electrodes 132 are obtained by sequentially scanning all the row sensor electrodes 132: Wy (1), Wy (2), . . . Wy (n−1), Wy (n) in the touch panel and the period (hereinafter, referred to as pressure-sensitive detection frame) in which the capacitance values of all the pressure-sensitive sensors 6 are obtained are synchronized. One touch detection frame may correspond to one pressure-sensitive detection frame. Instead, one touch detection frame may correspond to a plurality of pressure-sensitive detection frames, so that the pressure detection accuracy can be improved by the averaging. Further, one touch detection frame and one pressure-sensitive detection frame may be separated in terms of time. In addition, one touch detection frame may include a part of or the whole of one pressure-sensitive detection frame.

In this way, from the detection result on the pressing force caused by the operation element based on the capacitance changes of the pressure-sensitive sensors 6, the input can be determined. With this determination, an input error that is not a determined input and caused alone by a contact of an operation element on the operation screen of the touch panel 1 can be reduced, and thereby the operability can be improved.

With the following method, an input error that is not a determined input can be further reduced. When the sum of the change amounts Cpa of the capacitances Cpa of the pressure-sensitive sensors 6 at the positions P1 to P4 equals or exceeds a predetermined value, it is determined that the touch panel is pressed, and then a region of the touch coordinates estimated from the distribution of the pressing force detected by the pressure-sensitive sensors 6 at the positions P1 to P4 (hereinafter, called region of barycentric coordinates) is calculated. When the region of barycentric coordinates and the touch coordinates are close to each other or the touch coordinates is within the region of barycentric coordinates, the touch determination circuit 83 instructs the touch coordinate calculation circuit 87 to output the touch coordinates to the outside. That is, when the calculated distance between the region of barycentric coordinates and the touch coordinates is equal to or less than a predetermined distance, the touch determination circuit 83 instructs the touch coordinate calculation circuit 87 to output the touch coordinates to the outside. With such a method described above, an erroneous input can be further reduced.

For example, even when the capacitance at an intersection between a row sensor electrode 132 and a column sensor electrode 134 is changed by a water droplet or the like sticking to the front surface 1$f$ of the touch panel 1 or by the disturbance noise entering from the outside of the device via its power supply or the like, erroneous detection of the touch coordinates can be prevented by determining the input on the basis of the pressing force detected by the pressure-sensitive sensors 6.

According to the present first embodiment, the pressure-sensitive sensor 6 is formed on the touch sensor substrate 17. Therefore, compared with the touch panel provided with a conventional pressure-sensitive sensor disclosed in Patent Document 1, the step to mount the pressure-sensitive sensor onto the marginal portion of the housing and the step to mount the touch panel onto the pressure-sensitive sensor can be eliminated. That is, the touch panel having a pressure-sensitive sensor can be manufactured without an increase in the manufacturing time, and thus the manufacturing cost can also be reduced.

As previously described, the first electrode 15, the second electrode 16, the shielding wires 138, and the connecting wires 139 can be formed simultaneously or sequentially with the row sensor electrodes 132 or the column sensor electrodes 134, and thus the manufacturing processes of the touch panel can be shortened and the manufacturing cost can be further reduced.

In addition, in the touch panel having the conventional pressure-sensitive sensor as disclosed in Patent Document 1, since the pressure-sensitive sensor is disposed between the back surface of the touch panel and the marginal portion of the housing, wires need to be formed to connect the pressure-sensitive sensor to a circuit detecting the capacitance of the pressure-sensitive sensor, and the wires need to be provided on the housing or around the periphery of the touch panel. In contrast, according to the present first embodiment, the pressure-sensitive sensor 6 is connected to one of the connecting terminals 136 via the connecting wires 139 on the transparent substrate 131. That is, the wires that is formed to connect the pressure-sensitive sensor to a circuit detecting the capacitance of the pressure-sensitive sensor need not to be provided on the housing or around the periphery of the touch panel. Thus, the manufacturing time can be shortened and the manufacturing cost can be reduced when compared with a conventional touch panel.

Note that, since the conductive member 13 only needs to be disposed so as to face the first electrode 15 and the second electrode 16 and wires connecting the conductive member 13 to the outside are not required, compared with a conventional touch panel, the manufacturing time can be shortened and the manufacturing cost can be reduced.

Furthermore, a display device provided with the touch panel including the conventional pressure-sensitive sensor disclosed in Patent Document 1 has an air gap between the touch panel and the display panel. Thus, multiple reflection of visible light occurs between the back surface of the touch panel and the screen of the display panel that form boundaries of the air gap, so that a problem arises in that the visibility of the display panel is degraded.

In contrast, according to the present first embodiment, the display device 1000 is provided with a structure in which the touch panel 1 is adhered to and is held by the frame 3 and the liquid crystal panel 4 via the dielectric sheet 2. That is, the back surface of the touch sensor substrate 17 (the back surface 1$r$ of the touch panel 1) and the display surface 4$f$ of the liquid crystal panel 4 are adhered to each other via the dielectric sheet 2. Further, the refractive index of the dielectric sheet 2 is set to be substantially the same as those of the materials forming the back surface 1$r$ of the touch panel 1 and the display surface 4$f$ of the liquid crystal panel 4. Thus, degradation in the visibility of the display screen in the liquid crystal panel 4 due to multiple reflection of visible light between the back surface 1$r$ of the touch panel 1 and the display surface 4$f$ of the liquid crystal panel 4 does not take place.

Further, in a display device provided with the touch panel including the conventional pressure-sensitive sensor as shown in Patent Document 1, the touch panel is held by the housing (frame) via the pressure-sensitive sensor. Thus, when vibration or shock is applied to the display device, the stress depending on the weight of the touch panel may be applied to the pressure-sensitive sensor. In particular, when such a conventional display device is used for a portable electronic device such as a tablet, the problem may become more serious because it may be frequently exposed to vibration and shock.

In contrast, according to the present first embodiment, the pressure-sensitive sensor is formed inside the touch panel 1, and the back surface 1$r$ of the touch panel 1 is adhered not only to the display surface 4$f$ of the liquid crystal panel 4, but also to the marginal portion 3$e$ of the frame 3, via the dielectric sheet 2. Being capable of holding the touch panel 1, the dielectric sheet 2 can prevent excessive stress on the pressure-sensitive sensors even when vibration or shock is applied to the display device.

Note that, although the first electrode 15 and the second electrode 16 in the present first embodiment are exemplified to be rectangular in shape, the shape is not limited to be rectangular. As previously described, as long as the change amount ΔCpa monotonically increases or decreases in accordance with the pressing force, the shape and the size of the first electrode 15 and the second electrode 16 can be selected depending on the place to be disposed and the extent of the area.

Second Embodiment

In the first embodiment, the first electrode 15 and the second electrode 16 are exemplified to be rectangular in shape and to be arranged side by side in the same direction. Further, the capacitance Cp12, the capacitance Cp1$b$, and the capacitance Cp2$b$ are set so that the change amount ΔCpa can monotonically increase or decrease in accordance with the pressing force. In the second embodiment, a structure of the touch panel will be described in which the shapes of the first electrode 15 and the second electrode 16 are selected to make the capacitance Cp12 be larger compared with the capacitance Cp1$b$ and the capacitance Cp2$b$, and also the change amount ΔCpa relative to the capacitance Cpa is increased to make the pressure-sensitive sensor detection circuit 85 readily detect the change amount ΔCpa.

Figure 12:
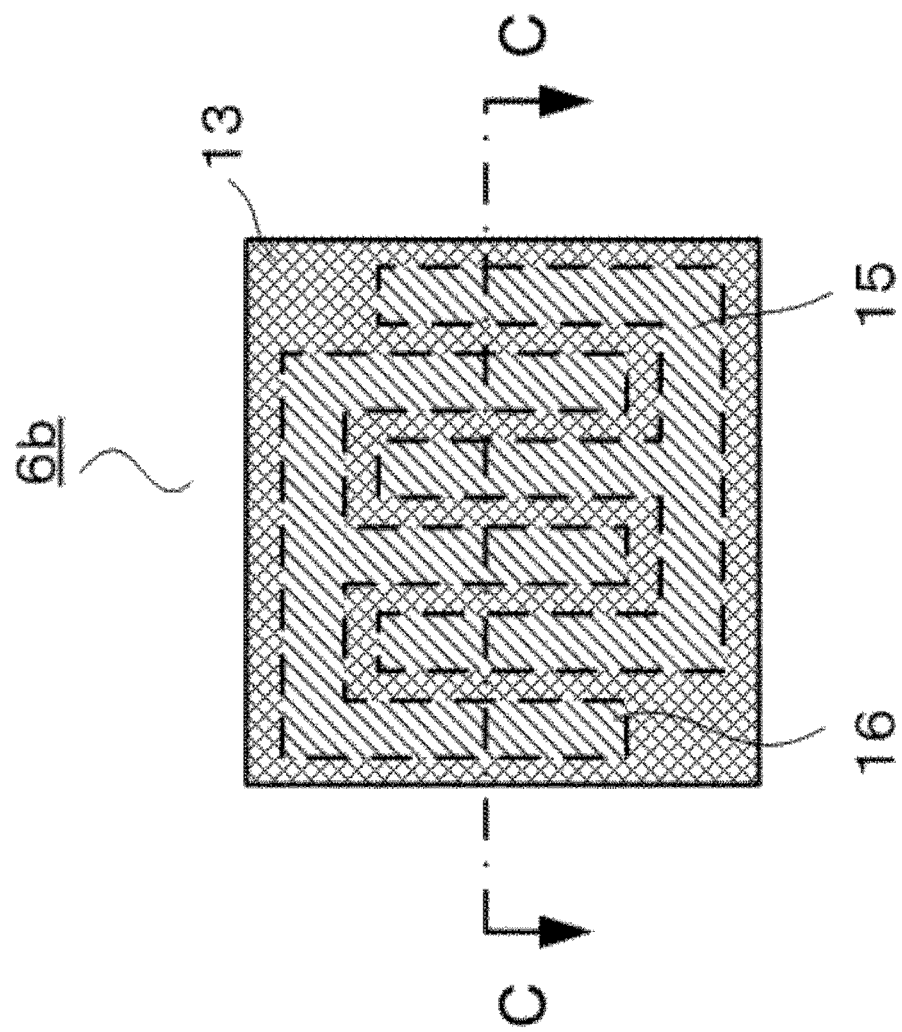
FIG. 12 is a plan view showing a pressure-sensitive sensor 6b according to a second embodiment of the present invention.
Figure 13:
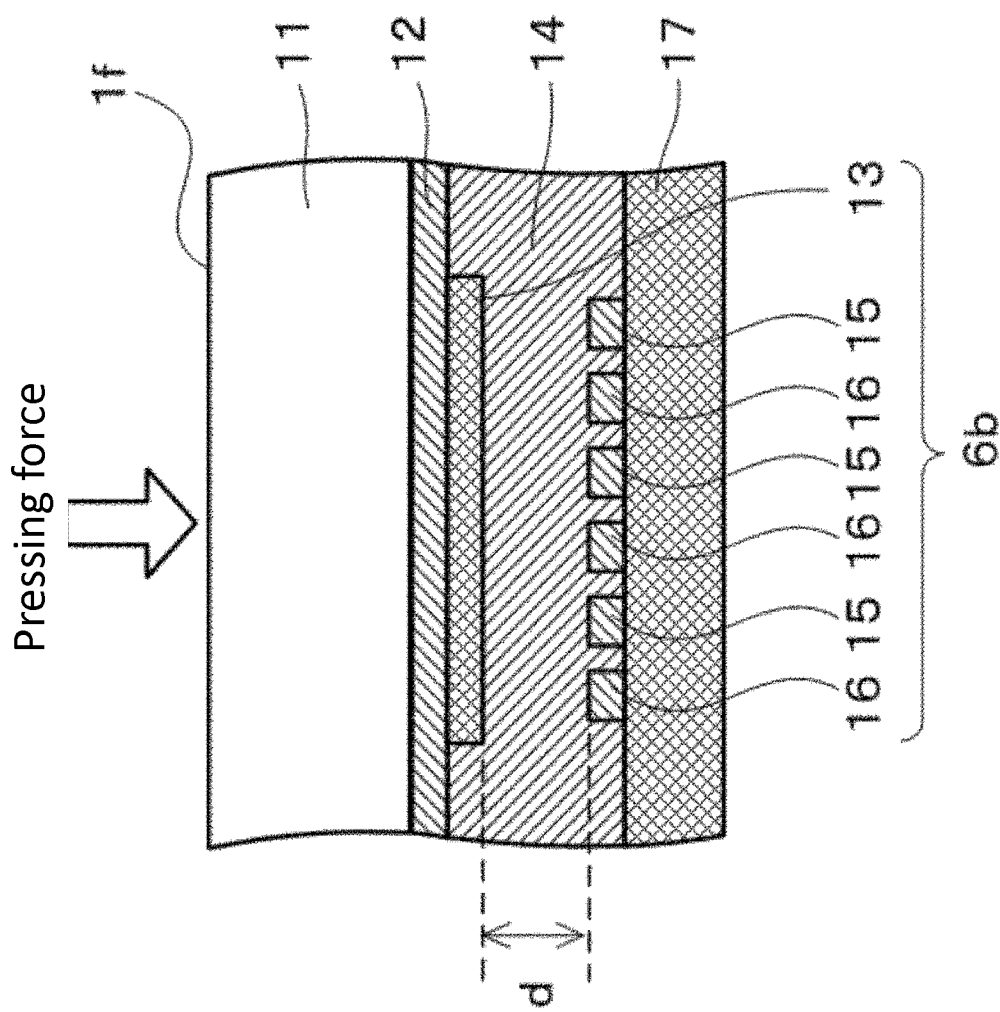
FIG. 13 is a cross-sectional view of the pressure-sensitive sensor 6b and its surroundings.

Referring to FIG. 12 and FIG. 13, a structure of a pressure-sensitive sensor 6$b$ according to the second embodiment will be described. FIG. 12 is a plan view showing a structure of the pressure-sensitive sensor 6$b$ according to the second embodiment. FIG. 13 is a cross-sectional view of the sensor taken along the dash-dotted line C-C shown in FIG. 12. Note that, instead of the pressure-sensitive sensor 6 shown in FIGS. 1 to 4 and FIG. 11 of the first embodiment, in the second embodiment, the pressure-sensitive sensor 6b is disposed. Note that, in FIG. 12 and FIG. 13, the same numerals or the same signs as used in FIG. 1 to FIG. 11 denote the same or equivalent components shown in the first embodiment, and thus the detailed description will be omitted.

As shown in FIG. 12, the first electrode 15 and the second electrode 16 are comb-shaped electrodes including a plurality of rectangular portions. In addition, the rectangular portions of the first electrode 15 and the rectangular portions of the second electrode 16 are arranged adjacent to each other at a plurality of locations. In addition, the conductive member 13 is disposed so as to face the first electrode 15 and the second electrode 16 via the dielectric sheet 14. With such an arrangement of the first electrode 15 and the second electrode 16, the capacitance Cp12 can be increased compared with the arrangement shown as an example in the first embodiment in which only one side of the first electrode 15 and one side of the second electrode 16 are placed adjacent to each other. Thus, the change amount ΔCpa relative to the capacitance Cpa is improved, and the detection sensitivity of the pressure-sensitive sensor detection circuit 85 can be improved.

In addition to the effects brought about in the first embodiment, an effect in the present second embodiment is such that the detection sensitivity of the pressure-sensitive sensor detection circuit 85 can be increased. Further, the first electrode 15 and the second electrode 16 are described as being comb-shaped electrodes including the plurality of rectangular portions, and the capacitance Cp12 can be increased when the rectangular portions are protruding. In other words, it suffices that the first electrode 15 and the second electrode 16 are the comb-shaped electrodes each having a plurality of protruding portions, the protruding portions of the first electrode 15 and the second electrode 16 being structured to be adjacent to each other.

Third Embodiment

In the second embodiment, a structure described is that the shapes of the first electrode 15 and the second electrode 16 are selected to make the capacitance Cp12 larger compared with the capacitance Cp1b and the capacitance Cp2b. In the present third embodiment, a structure of the touch panel will be described in which the first electrode 15 and the second electrode 16 are arranged so as to make the capacitance Cp12 be smaller compared with the capacitance Cp1b and the capacitance Cp2b and also the change amount ΔCpa relative to the capacitance Cpa is improved to make the pressure-sensitive sensor detection circuit 85 readily detect the change amount ΔCpa.

Figure 14:
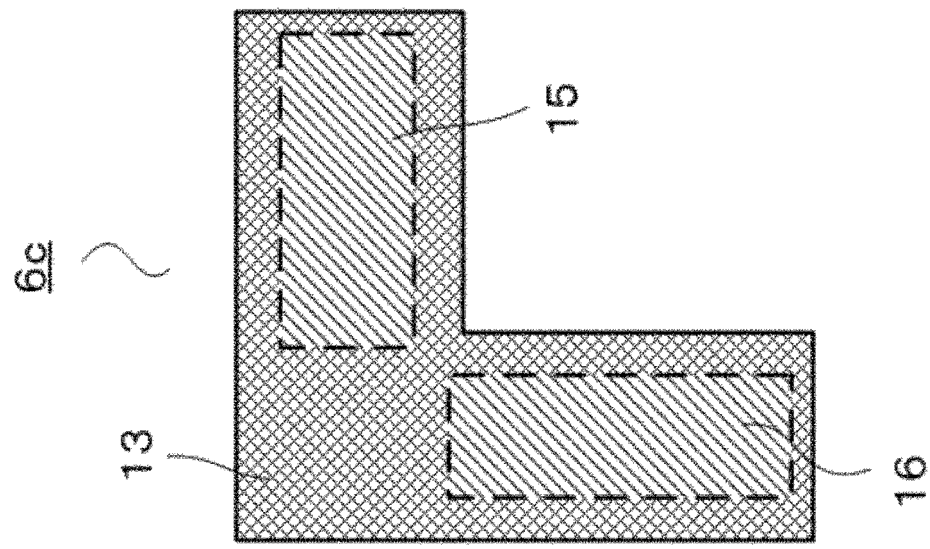
FIG. 14 is a plan view showing a pressure-sensitive sensor 6c according to a third embodiment of the present invention.
Figure 15:
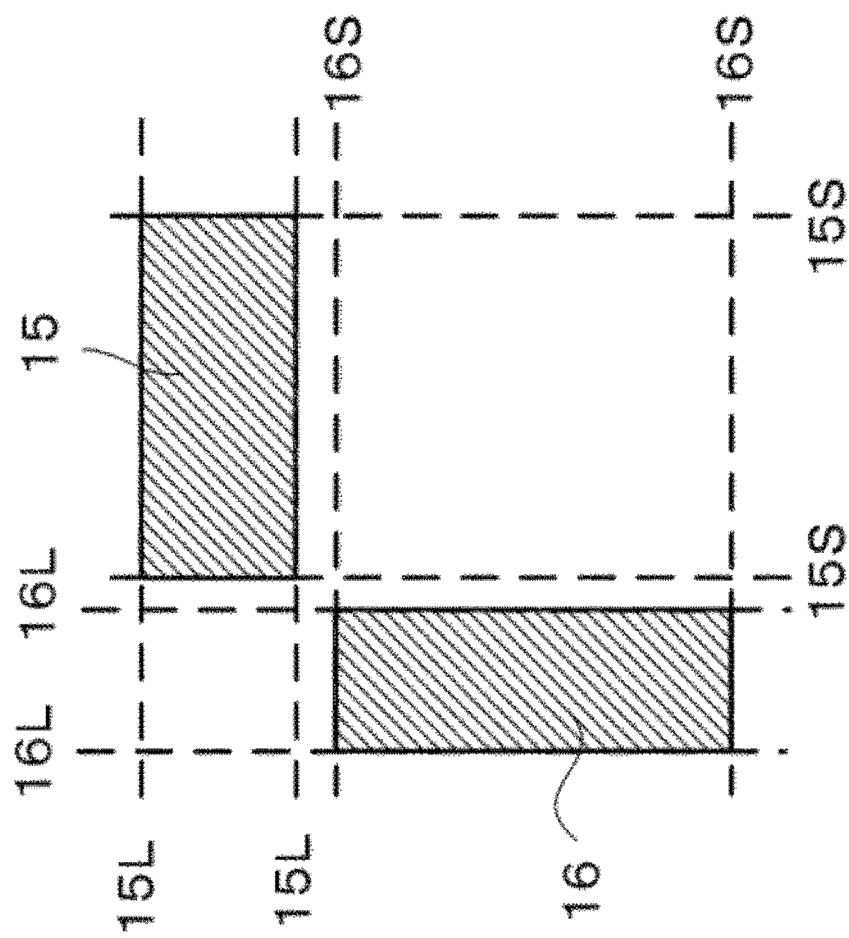
FIG. 15 is a drawing showing extended lines of the sides of a first electrode 15 and those of a second electrode 16 according to the third embodiment of the present invention.

Referring to FIG. 14 and FIG. 15, a structure of a pressure-sensitive sensor 6c according to the present third embodiment will be described. FIG. 14 is a plan view showing a structure of the pressure-sensitive sensor 6c according to the third embodiment. Note that, instead of the pressure-sensitive sensor 6 shown in FIGS. 1 to 4 and FIG. 11 of the first embodiment, the pressure-sensitive sensor 6c is disposed. FIG. 15 shows a positional relation among extended lines of the sides of the first electrode 15 and the second electrode 16 with respect to the first electrode 15 and the second electrode 16. In FIG. 14 and FIG. 15, the same numerals or the same signs as used in FIG. 1 to FIG. 11 denote the same or equivalent components as shown in the first embodiment, and their detailed description will be omitted.

As shown in FIG. 14, both the first electrode 15 and the second electrode 16 are rectangular in shape and are arranged in such a manner that whole of or a part of each side is arranged not to be adjacent to each other. In addition, the conductive member 13 is disposed to face the first electrode 15 and the second electrode 16. With this arrangement of the first electrode 15 and the second electrode 16, the capacitance Cp12 can be made smaller compared with the arrangement in which a side of the first electrode 15 and a side of the second electrode 16 are disposed adjacent to each other. Thus, the change amount ΔCpa relative to the capacitance Cpa is improved, so that the detection sensitivity of the pressure-sensitive sensor detection circuit 85 can be enhanced.

Referring to FIG. 15, the above arrangement of the first electrode 15 and the second electrode 16 will be described again. The figure shows the first electrode 15, its extended lines of the short sides 15S, its extended lines of the long sides 15L, the second electrode 16, its extended lines of the short sides 16S, and its extended lines of the long sides 16L. Both the extended lines of the short sides 15S and the extended lines of the long sides 15L of the first electrode 15 do not intersect with the second electrode 16. Similarly, both the extended lines of the short sides 16S and the extended lines of the long sides 16L of the second electrode 16 do not intersect with the first electrode 15. In other words, an arrangement of the first electrode 15 and the second electrode 16 in which the capacitance Cp12 can be reduced is the arrangement in which extended lines of the sides of one electrode do not intersects with the sides of the other electrode.

In addition to the effects brought about in the first embodiment, an effect in the present third embodiment is such that the detection sensitivity of the pressure-sensitive sensor detection circuit 85 can be enhanced.

Fourth Embodiment

Structures described in the first embodiment to the third embodiment are that the first electrode 15 and the second electrode 16 are provided at a plurality of locations in the periphery of the touch sensor portion 1s, and the first electrode 15 and the second electrode 16 are connected to the connecting terminals 136 via the connecting wires 139. In the present fourth embodiment, a structure will be described in which a first electrode 15b and a second electrode 16b are each formed in a loop to surround the touch sensor portion 1s in the inner peripheral portion of the front surface of the touch sensor substrate 17b.

Figure 16:
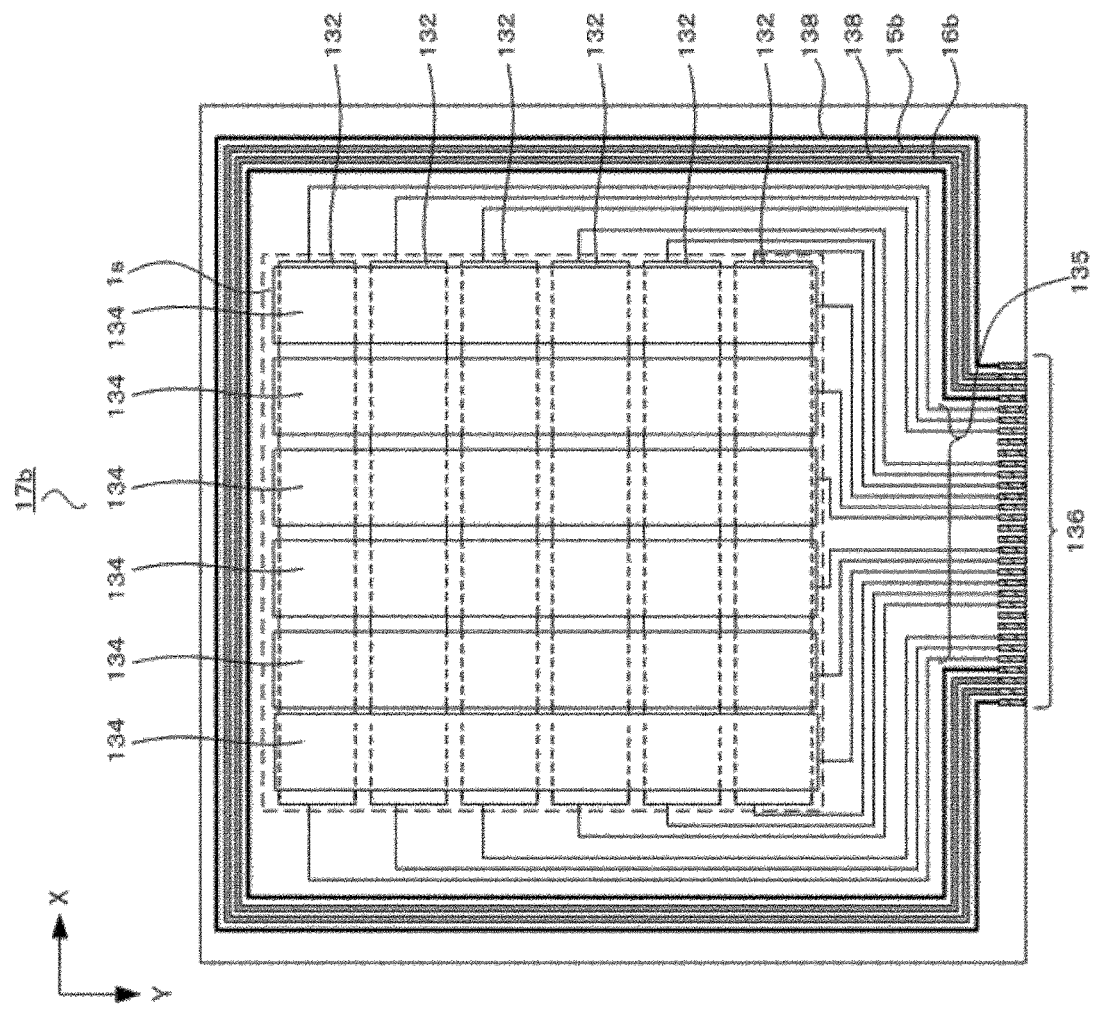
FIG. 16 is a plan view showing a touch sensor substrate 17b according to a fourth embodiment of the present invention.

FIG. 16 shows a structure of the touch sensor substrate 17b according to the fourth embodiment. In FIG. 16, the same numerals and the same signs as used in FIG. 1 to FIG. 11 denote the same or equivalent components as shown in the first embodiment, and their detailed description will be omitted.

As shown in FIG. 16, the first electrode 15b and the second electrode 16b are each formed in a loop to surround the touch sensor portion 1s in the inner peripheral portion of the front surface of the touch sensor substrate 17b, and the both ends of the first electrode 15b and the second electrode 16b are connected to the connecting terminals 136. The conductive member 13 (not illustrated) is disposed at a position so as to face the first electrode 15b and the second electrode 16b, and thereby forming a pressure-sensitive sensor 6d.

In comparison with the first embodiment, with the structure described above, it is possible to increase the capacitance Cp1b or the capacitance Cp2b because the area of the first electrode 15b or the second electrode 16b can be increased, and it is also possible to increase the capacitance Cp12 because the first electrode 15b and the second electrode 1611 can be arranged side by side in a longer length. Thus, the capacitance Cpa and the change amount ΔCpa of the pressure-sensitive sensor 6d can be increased, so that the sensitivity of the pressure-sensitive sensor 6d can be enhanced. In addition, for the pressure-sensitive sensor detection circuit 85 that detects the change in the capacitance Cpa of the pressure-sensitive sensor 6d, the number of input capacitance is one, so that its circuit structure can be simplified, leading to reduction of the manufacturing cost.

That is, in the present fourth embodiment, in addition to the effects brought about in the first embodiment, an effect is such that the detection sensitivity of the pressure-sensitive sensor detection circuit 85 can be enhanced and the manufacturing cost can be reduced.

Fifth Embodiment

In the fourth embodiment, the first electrode 15b and the second electrode 16b are each formed in a loop to surround the touch sensor portion 1s in the inner peripheral portion of the front surface of the touch sensor substrate 17b. In a fifth embodiment, a structure will be described in which the first electrode and the second electrode each formed in a loop are divided.

FIG. 17 shows a structure of a touch sensor substrate 17c according to the fifth embodiment. In FIG. 17, the same numerals and the same signs as used in FIG. 1 to FIG. 11 denote the same or equivalent components as shown in the first embodiment, and their detailed description will be omitted.

As shown in FIG. 17, a first electrode 15c and a second electrode 16c are each strip-shaped, and provided in such a manner that the long side of the first electrode 15c and the long side of the second electrode 16c extend along the periphery of the touch sensor portion 1s. The conductive member 13 (not illustrated) is disposed at a position so as to face the first electrode 15c and the second electrode 16c, and thereby forming a pressure-sensitive sensor 6e. Furthermore, a plurality of pressure-sensitive sensors 6e are formed. In the present fifth embodiment, four of the pressure-sensitive sensors 6e are disposed. Each of the first electrodes 15c is connected to a first end of one of the connecting wires 139 and a second end of the one of the connecting wire 139 is connected to one of the connecting terminals 136. In the same manner, each of the second electrodes 16c is connected to a first end of another one of the connecting wires 139 and a second end of the another one of the connecting wire 139 is connected to another one of the connecting terminal 136.

In comparison with the first embodiment, with the structure described above, it is possible to increase the capacitance Cp1b or the capacitance Cp2b because the area of the first electrode 15c or the second electrode 16c can be increased, and it is also possible to increase the capacitance Cp12 because the first electrode 15c and the second electrode 16c can be arranged side by side in a longer length. Thus, the capacitance Cpa and the change amount ΔCpa of the pressure-sensitive sensor 6e can be increased, so that the sensitivity of the pressure-sensitive sensor 6e can be enhanced. Furthermore, since the plurality of pressure-sensitive sensors 6e are formed, it is possible to calculate a region of barycentric coordinates. As previously described, when the region of barycentric coordinates and the touch coordinates are close to each other or the touch coordinates is within the region of barycentric coordinates, the touch determination circuit 83 instructs the touch coordinate calculation circuit 87 to output the touch coordinates to the outside. That is, when the calculated distance between the region of barycentric coordinates and the touch coordinates is equal to or less than a predetermined distance, the touch determination circuit 83 instructs the touch coordinate calculation circuit 87 to output the touch coordinates to the outside. With such a method described above, an erroneous input can be further reduced.

The first electrode 15 and the second electrode 16 described above are strip-shaped, however, the shape is not limited to be strip-shaped. It suffices that these electrodes are formed in the inner peripheral portion of the front surface of the touch sensor substrate 17c along the touch sensor portion 1s.

The touch panels in the first embodiment to the fifth embodiment are described by taking an example of the mutual capacitance method from among capacitance methods. The present invention, however, is not limited by the method of the touch panel. For example, the methods of touch panels include a resistive film method, a surface acoustic wave method, and an infrared method.

The display panels in the first embodiment to the fifth embodiment are described by taking an example of the liquid crystal panel 4. The present invention, however, is not limited by the type of the display panel. For example, in the types of display panels, there are an organic electro luminescence (EL) panel, a plasma panel, and a segment panel.

In addition, in the first embodiment to the fifth embodiment, the structures are described in which the dielectric sheet 14 is sandwiched between the first electrode and the second electrode. However, in a case where the sensitivity of the pressure-sensitive sensor is high enough, it is not necessary that the dielectric sheet 2, etc. be sandwiched between the first electrode and the second electrode. For example, in a case where the areas for the first electrode and the second electrode are large enough or in a case where the gap between the first electrode and the second electrode can be shortened, the gap may be left as an air gap.

Furthermore, within the scope of the invention, each embodiment can be freely combined, or each embodiment can properly be modified or be omitted.

DESCRIPTION OF SYMBOLS 1 touch panel
1s touch sensor portion
2 dielectric sheet
3 frame
3a opening
3e marginal portion
4 liquid crystal panel
6, 6b to 6e pressure-sensitive sensor
11 protective plate
14 dielectric sheet
15, 15b, 15c first electrode
16, 16b, 16c second electrode
17, 17b, 17c touch sensor substrate
139 connecting wire
1000 display device

The invention claimed is:
1. A touch panel comprising:
a touch sensor substrate having a central portion, an inner peripheral portion, and a touch sensor portion in the central portion;
a protective plate to cover a front surface of the touch sensor substrate;

a first dielectric sheet disposed between the touch sensor substrate and the protective plate along a first axis;

a first electrode and a second electrode disposed next to one another, along a second axis, on the front surface of the inner peripheral portion of the touch sensor substrate, the second axis being perpendicular to the first axis; and a conductive member, an entirety of which is disposed between the inner peripheral portion of the touch sensor substrate and the protective plate along the first axis and at a position so as to face the first electrode and the second electrode, wherein the conductive member is not connected to the first electrode and the second electrode, the first dielectric sheet is disposed between the first electrode and the conductive member along the first axis, between the second electrode and the conductive member along the first axis, and between the first electrode and the second electrode along the second axis, and the first electrode, the second electrode, and the conductive member constitute a pressure-sensitive sensor that detects a pressing force applied to the touch panel based on change amounts in:

a first capacitance between the first electrode and the conductive member along the first axis;

a second capacitance between the second electrode and the conductive member along the first axis; and a third capacitance between the first electrode and the second electrode along the second axis.

2. The touch panel according to claim 1, wherein the conductive member is disposed on an inner peripheral portion of a back surface of the protective plate.

3. The touch panel according to claim 2, wherein the touch sensor substrate is provided with first wiring connected to the first electrode, second wiring connected to the second electrode, and shielding wiring disposed along the first wiring or the second wiring.

4. The touch panel according to claim 2, wherein both the first electrode and the second electrode are comb-shaped electrodes each having a plurality of protruding portions, the protruding portions of the first electrode and the protruding portions of the second electrode being disposed adjacent to each other.

5. The touch panel according to claim 2, wherein both the first electrode and the second electrode are rectangular in shape, and an extended line of a side of one electrode of the first electrode and the second electrode does not intersect with a side of the other electrode.

6. The touch panel according to claim 2, wherein the first electrode and the second electrode are formed in a loop in the inner peripheral portion of the touch sensor substrate so as to surround the touch sensor portion.

7. The touch panel according to claim 2, wherein the first electrode and the second electrode are formed along the touch sensor portion in the inner peripheral portion of the touch sensor substrate.

8. A display device, comprising:
the touch panel according to claim 2;
a second dielectric sheet having a front surface that is adhered to a back surface of the touch panel;
a frame having an opening in a central portion of the frame, the frame being adhered to a back surface of the second dielectric sheet in a marginal portion of the frame; and
a display panel having a display surface to display a screen image, the display surface being adhered to the back surface of the second dielectric sheet in the opening of the frame.

9. The touch panel according to claim 1, wherein the touch sensor substrate is provided with first wiring connected to the first electrode, second wiring connected to the second electrode, and shielding wiring disposed along the first wiring or the second wiring.

10. The touch panel according to claim 9, wherein both the first electrode and the second electrode are comb-shaped electrodes each having a plurality of protruding portions, the protruding portions of the first electrode and the protruding portions of the second electrode being disposed adjacent to each other.

11. The touch panel according to claim 9, wherein both the first electrode and the second electrode are rectangular in shape, and an extended line of a side of one electrode of the first electrode and the second electrode does not intersect with a side of the other electrode.

12. The touch panel according to claim 1, wherein both the first electrode and the second electrode are comb-shaped electrodes each having a plurality of protruding portions, the protruding portions of the first electrode and the protruding portions of the second electrode being disposed adjacent to each other.

13. The touch panel according to claim 1, wherein both the first electrode and the second electrode are rectangular in shape, and an extended line of a side of one electrode of the first electrode and the second electrode does not intersect with a side of the other electrode.

14. The touch panel according to claim 1, wherein the first electrode and the second electrode are formed in a loop in the inner peripheral portion of the touch sensor substrate so as to surround the touch sensor portion.

15. The touch panel according to claim 1, wherein the first electrode and the second electrode are formed along the touch sensor portion in the inner peripheral portion of the touch sensor substrate.

16. The touch panel according to claim 1, wherein the first capacitance and the second capacitance are connected in series, and the third capacitance is connected in parallel with a capacitance created by connecting the first capacitance and the second capacitance in series.

17. A display device, comprising:
the touch panel according to claim 1;
a second dielectric sheet having a front surface that is adhered to a back surface of the touch panel;
a frame having an opening in a central portion of the frame, the frame being adhered to a back surface of the second dielectric sheet in a marginal portion of the frame; and
a display panel having a display surface to display a screen image, the display surface being adhered to the back surface of the second dielectric sheet in the opening of the frame.

18. The touch panel according to claim 1, further comprising a light shield, wherein
an entirety of the light shield is disposed in the central portion, and
the light shield is in contact with the protective plate and the first dielectric sheet.

* * * * *